United States Patent
Masuda et al.

(10) Patent No.: US 7,064,172 B2
(45) Date of Patent: Jun. 20, 2006

(54) CATALYST FOR PRODUCTION OF A POLYURETHANE RESIN AND METHOD FOR PRODUCING A POLYURETHANE RESIN

(75) Inventors: Takahiro Masuda, Shinnanyo (JP); Hiroaki Nakamura, Shinnanyo (JP); Yutaka Tamano, Tokuyama (JP)

(73) Assignee: Tosoh Corporation, Yamaguchi-ken (JP)

( * ) Notice: Subject to any disclaimer, the term of this patent is extended or adjusted under 35 U.S.C. 154(b) by 105 days.

(21) Appl. No.: 10/757,422

(22) Filed: Jan. 15, 2004

(65) Prior Publication Data

US 2004/0147705 A1    Jul. 29, 2004

Related U.S. Application Data

(62) Division of application No. 10/151,288, filed on May 21, 2002, now Pat. No. 6,723,819.

(30) Foreign Application Priority Data

| May 22, 2001 | (JP) | 2001-152362 |
| Jul. 2, 2001 | (JP) | 2001-200957 |
| Aug. 21, 2001 | (JP) | 2001-250674 |
| Sep. 28, 2001 | (JP) | 2001-301647 |
| Jan. 16, 2002 | (JP) | 2002-007516 |

(51) Int. Cl.
*C08G 18/20* (2006.01)

(52) U.S. Cl. .................. 528/5.3; 521/129; 502/167
(58) Field of Classification Search ............... None
See application file for complete search history.

(56) References Cited

U.S. PATENT DOCUMENTS

| 3,448,065 A | * | 6/1969 | Green ................. 521/118 |
| 4,248,930 A | * | 2/1981 | Haas et al. ............ 428/319.7 |
| 5,011,935 A | | 4/1991 | Nakatani et al. |
| 5,233,039 A | | 8/1993 | Listemann et al. |
| 5,756,558 A | * | 5/1998 | Savoca et al. ............. 521/167 |
| 6,410,608 B1 | | 6/2002 | Sakai et al. |

FOREIGN PATENT DOCUMENTS

| DE | 199 30 098 A | 1/2001 |
| EP | 1092737 | 4/2001 |
| EP | 1 138 708 A | 10/2001 |
| JP | 46-4846 | 11/1971 |
| JP | 57-14762 | 3/1982 |
| JP | 59-191743 | 10/1984 |
| JP | 61-31727 | 7/1986 |
| JP | 63 090529 A | 4/1988 |

* cited by examiner

*Primary Examiner*—Rachel Gorr
(74) *Attorney, Agent, or Firm*—Nixon & Vanderhye P.C.

(57) ABSTRACT

Catalyst containing various amine compounds are described, for the production of polyurethane resins.

4 Claims, No Drawings

CATALYST FOR PRODUCTION OF A POLYURETHANE RESIN AND METHOD FOR PRODUCING A POLYURETHANE RESIN

CROSS-REFERENCE TO RELATED APPLICATION

This application is a divisional application of Ser. No. 10/151,288, filed May 21, 2002 (allowed Nov. 20, 2003), now U.S. Pat. No. 6,723,819.

The present invention relates to a catalyst for production of a polyurethane resin such as a flexible polyurethane foam, a semi-rigid polyurethane foam, a rigid polyurethane foam or a polyurethane elastomer, and a method for producing a polyurethane resin employing such a catalyst. More particularly, it relates to a catalyst and a method for producing a polyurethane resin and a polyurethane foam, which do not substantially discharge a volatile amine.

A polyurethane resin is produced by reacting a polyol with a polyisocyanate in the presence of a catalyst and, if necessary, a blowing agent, a surfactant, a cross-linking agent, etc. Heretofore, it has been known to employ various metal compounds or tertiary amine compounds as catalysts for production of such polyurethane resins. These catalysts are industrially used alone or in combination.

Among these catalysts, tertiary amine compounds are particularly excellent in productivity and moldability and thus widely used as tertiary amine catalysts for production of polyurethane resins. They include, for example, conventional compounds such as triethylenediamine, N,N,N',N'-tetramethyl-1,6-hexanediamine, bis(2-dimethylaminoethyl) ether, N,N,N',N'',N''-pentamethyldiethylenetriamine, N-methylmorpholine, N-ethylmorpholine and N,N-dimethylethanolamine.

Metal catalysts tend to be poor in productivity and moldability, and in most cases, they are used in combination with tertiary amine catalysts, and they are rarely employed alone.

However, the tertiary amine catalysts will remain in a free form in polyurethane resin products and will gradually be discharged as volatile amines, whereby various problems will be brought about. For example, a volatile amine discharged from a polyurethane foam in the interior of an automobile creates an odor problem. Further, in recent years, there has been a so-called fogging problem, such that a volatile component in a polyurethane foam will deposit on a window glass of an automobile thereby to bring about fogging of the window glass and thereby to reduce the commercial value. In addition to such problems, there is a pollution problem such that a volatile amine discharged from such a polyurethane product will pollute other materials.

As a method for solving such problems caused by the volatile tertiary amine catalysts, it has been proposed to employ an amine catalyst having in its molecule, primary and secondary amino groups or a hydroxyalkyl group which is capable of reacting with a polyisocyanate (JP-A-46-4846, JP-A-59-191743, JP-B-61-31727, JP-B-57-14762). It is said that the above problems can be avoided, since the amine catalyst will be fixed in the polyurethane resin skeleton in the form as reacted with a polyisocyanate.

However, most of such amine catalysts having a reactive group undergo an incomplete reaction, and a small amount thereof will remain in a free form in polyurethane resin products and will gradually be discharged as volatile amines. Further, although they may once react with the polyisocyanate and be fixed in the polyurethane resin skeleton, they will be discharged as free amines in a small amount when the polyurethane products are brought to a high temperature to bring decomposition of bonds. Further, with the amine catalysts having primary and secondary amino groups, curing of the polyurethane resin tends to be inadequate, thereby to bring about a decrease in the productivity, and further, moldability and physical properties of polyurethane products to be produced tend to be inadequate.

Further, as a method for solving such problems caused by the volatile tertiary amine catalysts, it has been proposed to employ an amine catalyst having a ureide group (such as $CONH_2$) in its molecule (JP-A-61-85431). It is disclosed that with such an amine catalyst having a ureide group, volatility and odor tend to decrease as compared with an amine catalyst having no such functional group. Further, it is disclosed that the catalyst having a ureide group is fixed in the polyurethane resin skeleton in the form as reacted with a polyisocyanate, whereby the fogging problem may be avoided. However, the amine catalyst having a ureide group usually has a low or modest level of catalytic activity, whereby productivity of the urethane resin tends to be poor.

Further, metal catalysts other than the amine catalysts, such as organic tin compounds, will not bring about the above problems, but by their single use, the productivity, physical properties and moldability tend to be poor, and further, environmental problems due to metals remaining in products have been pointed out.

The present invention has been made in view of the above problems, and its object is to provide a method for producing such a polyurethane resin that substantially no amine is discharged from products, with good productivity and moldability, and a catalyst to be used for the method.

The present inventors have conducted extensive studies to overcome the above problems and as a result, have found that substantially no volatile amine is generated, no decomposition of bonds takes place, and further, a polyurethane resin can be obtained with good moldability and productivity, by using as an amine catalyst in production of a polyurethane resin, a catalyst selected from the group consisting of a catalyst (A) containing an amine compound of the following formula (1):

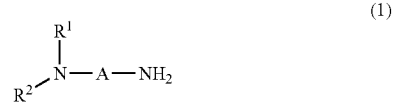

wherein each of $R^1$ and $R^2$ which are independent of each other, is a $C_{1-4}$ alkyl group, and A is a $C_{5-10}$ straight chain or branched chain alkylene group, which contains one primary amino group and one tertiary amino group in its molecule, the carbon number of the alkylene group between the two amino groups being from 5 to 10; a catalyst (B) containing an amine compound of the following formula (2):

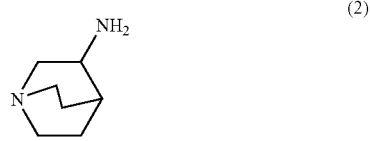

, which has a quinuclidine skelton containing a primary amino group in its molecule;

a catalyst (C) containing a urea-addition product of 3-aminoquinuclidine of the following formula (3):

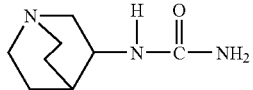
(3)

a catalyst (D) containing an amine compound of the following formula (5):

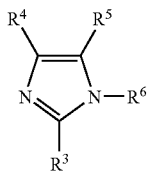
(5)

wherein each of $R^3$, $R^4$ and $R^5$ which are independent of one another, is a hydrogen atom or a $C_{1-4}$ alkyl group, $R^6$ is a hydrogen atom, a functional group of the following formula:

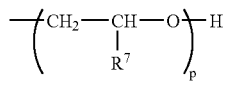

wherein $R^7$ is a hydrogen atom or a $C_{1-4}$ alkyl group, and p is an integer of from 1 to 3, or a 3-aminopropyl group, and an amine compound of the following formula (6):

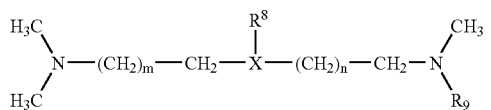
(6)

wherein X is a nitrogen atom or an oxygen atom, each of $R^8$ and $R^9$ which are independent of each other, is a methyl group or a functional group of the following formula:

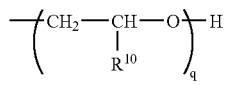

wherein $R^{10}$ is a hydrogen atom or a $C_{1-4}$ alkyl group, and q is an integer of from 1 to 3, and each of m and n is an integer of from 1 to 2, provided that when X is a nitrogen atom, $R^8$ and $R^9$ are not simultaneously methyl groups, and that when X is an oxygen atom, $R^9$ is a functional group of the following formula:

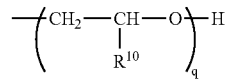

wherein $R^{10}$ is a hydrogen atom or a $C_{1-4}$ alkyl group, and q is an integer of from 1 to 3; and a catalyst (E) containing an amine compound of the following formula (7):

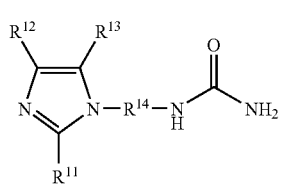
(7)

wherein each of $R^{11}$, $R^{12}$ and $R^{13}$ which are independent of one another, is a hydrogen atom or a $C_{1-4}$ straight chain or branched chain alkyl group, and $R^{14}$ is a $C_{1-4}$ straight chain or branched chain alkylene group. The present invention has been accomplished on the basis of this discovery.

Namely, the present invention provides a method for producing a polyurethane resin, which comprises reacting a polyol with a polyisocyanate in the presence of a catalyst selected from the group consisting of the above catalysts (A), (B), (C), (D) and (E), and a catalyst for production of a polyurethane resin.

Now, the present invention will explained in detail with reference to the preferred embodiments.

In the present invention, the amine compound of the formula (1) contains one primary amino group and one tertiary amino group in its molecule, and the carbon number of the alkylene group between the two amino groups is from 5 to 10. The carbon number is preferably from 5 to 8 in view of the amount of the amine remaining in the polyurethane resin and catalytic activity, and it is particularly preferably 5 or 6.

Here, it has been proposed to employ a dialkyl-substituted primary amine such as dimethylaminopropylamine or diethylaminoethylamine as a catalyst for production of a polyurethane foam (JP-A-46-4846).

However, with this method, there are problems of odor and toxicity similar to conventional volatile tertiary amines, and there is such a problem that flowability at the time of foaming tends to be poor, whereby every hole and corner of a mold may not be filled with the reaction product (JP-A-59-191743).

Accordingly, JP-A-59-191743 discloses to employ a carbonate of the dialkyl-substituted primary amine to overcome the problems of the method of JP-A-46-4846.

For example, it discloses that there is no odor at the time of removal from a mold, since all the catalyst molecules having primary amino groups (—$NH_2$) in their molecules, react with isocyanate groups and chemically bonded to the polymer skeleton. Further, it disclose that the alkylene group in the dialkyl-substituted primary amine is preferably an ethylene, n-propylene or n-butylene group in view of catalytic activity.

However, according to studies by the present inventors, it was found that a carbonate of a dialkyl-substituted primary amine having an ethylene, n-propylene or n-butylene group as the alkylene group which is disclosed as a preferred catalyst in JP-A-59-191743, has a low catalytic activity, whereby the productivity tends to be low in production of a polyurethane resin, and further, the moldability tends to be poor. It is also found that the dialkyl-substituted primary amine tends to remain in a large amount in a free form in the urethane resin along with the increase in the carbon number of the alkylene group, whereby the odor tends to be significant.

On the other hand, the present inventors have found that the amine compound of the formula (1) of the present invention has a specifically high catalytic activity and significantly improves productivity and moldability, and in addition, it remains only in a small amount in a free form in the urethane resin, whereby a foam which gives a reduced amine odor can be obtained. Accordingly, the present invention has especial effects which are unexpectable from prior arts.

The amine compound of the present invention may, for example, be N,N-dimethylpentamethylenediamine, N,N-dimethylhexamethylenediamine, N,N-dimethylheptamethylenediamine, N,N-dimethyloctamethylenediamine, N,N-dimethylnonamethylenediamine, N,N-dimethyldecamethylenediamine, N,N-diethylpentamethylenediamine, N,N-diethylhexamethylenediamine, N,N-diethylheptamethylenediamine, N,N-diethyloctamethylenediamine, N,N-diethylnonamethylenediamine, N,N-diethyldecamethylenediamine, N,N-dipropylpentamethylenediamine, N,N-dipropylhexamethylenediamine, N,N-dipropylheptamethylenediamine, N,N-dipropyloctamethylenediamine, N,N-dipropylnonamethylenediamine, N,N-dipropyldecamethylenediamine, N,N-dibutylpentamethylenediamine, N,N-dibutylhexamethylenediamine, N,N-dibutylheptamethylenediamine, N,N-dibutyloctamethylenediamine, N,N-dibutylnonamethylenediamine or N,N-dibutyldecamethylenediamine. Among them, more preferred are N,N-dimethylpentamethylenediamine and N,N-dimethylhexamethylenediamine having a high catalytic activity.

The amine compound of the formula (1) contained in the catalyst (A) of the present invention can easily be produced by a known method. A method may, for example, be mentioned, wherein a dialkyl amine is reacted with bromoalkyl-N-phthalimide obtained by a reducing amination reaction of a dialkylaminoalkanol with ammonia or by a reaction of an alkyl dibromide with potassium phthalimide in the presence of excess alkyl dibromide, and then hydrazine is reacted therewith.

The amount of the catalyst (A) of the present invention in production of a polyurethane resin is from 0.01 to 10 parts by weight, preferably from 0.05 to 5 parts by weight, per 100 parts by weight of the polyol to be used. If a large amount of the catalyst is used, the productivity of the polyurethane resin may improve, but the amount of a volatile amine also increase, such being unfavorable.

The catalyst (B) for production of a polyurethane resin of the present invention contains 3-aminoquinuclidine of the formula (2).

The amine compound of the formula (2) contained in the catalyst (B) of the present invention can easily be produced, for example, by neutralizing commercially available 3-aminoquinuclidine dihydrochloride with an alkali metal aqueous solution. Specifically, a method wherein 3-aminoquinuclidine dihydrochloride (manufactured by Aldlich) is neutralized with a 48% sodium hydroxide aqueous solution, followed by extraction with benzene, may, for example, be mentioned.

The amount of the catalyst (B) of the present invention in production of a polyurethane resin is from 0.01 to 10 parts by weight, preferably from 0.05 to 5 parts by weight, per 100 parts by weight of the polyol to be used. If a large amount of the catalyst is used, the productivity of the polyurethane resin may improve, but the amount of a volatile amine also increase, such being unfavorable.

The catalyst (C) for production of a polyurethane resin of the present invention contains an amine compound of the formula (3). Further, the catalyst (C) for production of a polyurethane resin of the present invention may contain the amine compound of the formula (3) and an amine compound of the following formula (4):

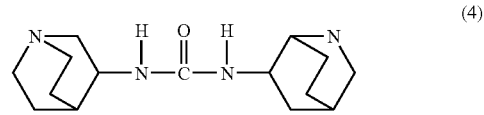

The catalyst (C) of the present invention preferably contains from 50 to 95 wt % of the amine compound of the formula (3) and from 5 to 50 wt % of the compound of the formula (4), based on the total amount of the compound of the formula (3) and the compound of the formula (4). If the amine compound of the formula (3) is less than 50 wt %, the catalytic activity tends to be low, whereby productivity of the polyurethane resin tends to be poor.

The amine compound of the formula (3) and the amine compound of the formula (4) may be produced, for example, by reacting urea and 3-aminoquinuclidine in an appropriate molar ratio under heating. Accordingly, the catalyst (C) of the present invention may contain unreacted urea in an amount up to 20 wt %. The compound of the formula (3) and the compound of the formula (4) may separately be isolated by e.g. chromatography, recrystallization, sublimation or distillation.

The amount of the catalyst (C) of the present invention in production of a polyurethane resin is from 0.01 to 10 parts by weight per 100 parts by weight of the polyol to be used. It is preferably from 0.05 to 5 parts by weight, since if a large amount of the catalyst is used, the amount of the catalyst to be incorporated in the polyurethane resin as a terminator tends to be large, whereby physical properties (functional properties) of the resin tend to be deteriorated.

The catalyst (D) for production of a polyurethane resin of the present invention contains an amine compound of the formula (5) and an amine compound of the formula (6).

In the present invention, the compound of the formula (5) is an imidazole compound having a reactive group. In view of catalytic activity, preferably $R^3$ is a hydrogen atom or a methyl group, each of $R^4$ and $R^5$ is a hydrogen atom, and $R^6$ is a 2-hydroxypropyl group, a 2-hydroxyethyl group or a 3-aminopropyl group.

Specifically, the amine compound of the formula (5) of the present invention may, for example, be imidazole, 2-methylimidazole, 1-(2'-hydroxypropyl)-imidazole, 1-(2'-hydroxypropyl)-2-methylimidazole, 1-(2'-hydroxyethyl)-imidazole, 1-(2'-hydroxyethyl)-2-methylimidazole, 1-(3'-aminopropyl)-imidazole, 1-(3'-aminopropyl)-2-methylimidazole, 1-(3'-hydroxypropyl)-imidazole or 1-(3'-hydroxypropyl)-2-methylimidazole. Among them, preferred are 1-(2'-hydroxypropyl)-imidazole, 1-(2'-hydroxypropyl)-2-methylimidazole, 1-(2'-hydroxyethyl)-imidazole, 1-(2'-hydroxyethyl)-2-methylimidazole, 1-(3'-aminopropyl)-imidazole and 1-(3'-aminopropyl)-2-methylimidazole in view of high catalytic activity.

The amine compound of the formula (6) of the present invention is a tertiary amine catalyst having a reactive group, and it may, for example, be N-(2-hydroxypropyl)-N,N',N'',N''-tetramethyldiethylenetriamine, N'-(2-hydroxypropyl)-N,N,N'',N''-tetramethyldiethylenetriamine, N-(2-hydroxyethyl)-N,N',N'',N''-tetramethyldiethylenetriamine, N'-(2-hydroxyethyl)-N,N,N'',N''-tetramethyldiethylenetriamine, N-(2-hydroxybutyl)-N,N',N'',N''-tetramethyldiethylenetriamine, N'-(2-hydroxybutyl)-N,N,N'',N''-tetramethyldiethylenetriamine, N-(2-hydroxypentyl)-N,N',N'',N''-tetramethyldiethylenetriamine, N'-(2-hydroxypentyl)-N,N,N'',N''-tetramethyldiethylenetriamine, N-(2-hydroxyhexyl)-N,N',N'',N''-tetramethyldiethylenetriamine, N'-(2-hydroxyhexyl)-N,N,N'',N''-tetramethyldiethylenetriamine, N'-(2-hydroxypropryl)-N,N,N'-trimethyl-bis(2-aminoethyl)ether, N'-(2-hydroxyethyl)-N,N,N'-trimethyl-bis(2-aminoethyl) ether and N'-(2-ethoxyethanol)-N,N,N'-trimethyl-bis(2-aminoethyl)ether. Among them, preferred are N-(2-hydroxyethyl)-N,N,N'',N''-tetramethyldiethylenetriamine, N'-(2-hydroxyethyl)-N,N,N'',N''-tetramethyldiethylenetriamine, N-(2-hydroxypropyl)-N,N',N'',N''-tetramethyldiethylenetriamine, N'-(2-hydroxypropyl)-N,N,N'',N''-tetramethyldiethylenetriamine, N'-(2-hydroxypropryl)-N,N,N'-trimethyl-bis(2-aminoethyl)ether and N'-(2-hydroxyethyl)-N,N,N'-trimethyl-bis(2-aminoethyl)ether in view of high catalytic activity.

The amine compound of the formula (5) and the amine compound of the formula (6) contained in the catalyst (D) of the present invention can easily be produced by a known method respectively. The compound of the formula (5) is obtained, for example, by reacting 2-methylimidazole with acrylonitrile, followed by amination by hydrogenation or by a reaction of 2-methylimidazole with propylene oxide or ethylene oxide. Further, the compound of the formula (6) may be obtained, for example, by reacting diethylene triamine with propylene oxide, followed by reducing methylation.

If the compound of the formula (5) or the compound of the formula (6) in the catalyst (D) of the present invention is used for production of a polyurethane resin by itself, the productivity and moldability of the products tend to be poor, and further, the amount of the amine to be discharged from the products can not adequately be decreased. Namely, the compound of the formula (5) has a low catalytic activity, and a large amount thereof is required, whereby it is likely to remain as an amine in a free form in a polyurethane resin, and the amount of an amine to be discharged tends to increase. Further, curing of the polyurethane resin tends to be slow, whereby productivity tends to be poor. The compound of the formula (6) has a high catalytic activity, and thus curing of the polyurethane resin tends to be quickened, however, there is a problem in moldability such that foam products may shrink or deform.

However, surprisingly, when the compound of the formula (5) and the compound of the formula (6) are mixed, the catalytic activity as a catalyst mixture becomes high by a synergistic effect, and the amount of the catalyst can be decreased, and as a result, the amount of an amine to be discharged is small. Further, curing of the polyurethane resin tends to be quickened, stability of the foam can be increased, and products having a good moldability without deformation can be obtained.

The mixing ratio in the catalyst composition of the present invention is not particularly limited, but the proportion of the compound of the formula (5) to the compound of the formula (6) is preferably from 1/9 to 9/1 by a weight ratio. It is more preferably from 3/7 to 7/3.

The amount of the catalyst (D) of the present invention in production of a polyurethane resin is from 0.01 to 10 parts by weight per 100 parts by weight of the polyol to be used, and it is preferably from 0.01 to 7 parts by weight in order to further reduce the amine to be discharged.

The catalyst (E) of the present invention contains a compound of the formula (7). The catalyst of the present invention may further contain, in addition to the compound of the formula (7), a compound of the following formula (8):

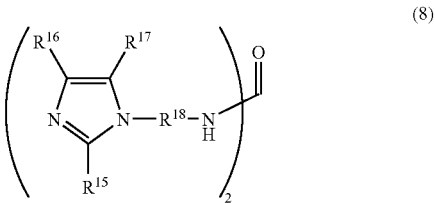

wherein each of $R^{15}$, $R^{16}$ and $R^{17}$ which are independent of one another, is a hydrogen atom or a $C_{1-4}$ straight chain or branched chain alkyl group, and $R^{18}$ is a $C_{1-4}$ straight chain or branched chain alkylene group.

The catalyst (E) of the present invention preferably contains from 50 to 100 wt % of the compound of the formula (7) and from 0 to 50 wt % of the compound of the formula (8) based on the total amount of the compound of the formula (7) and the compound of the formula (8). If the compound of the formula (7) is less than 50 wt %, the catalytic activity tends to be low, and productivity of the polyurethane resin may decrease.

In the present invention, the compound of the formula (7) is preferably a compound wherein $R^{11}$ is a hydrogen atom or a methyl group, each of $R^{12}$ and $R^{13}$ is a hydrogen atom, and $R^{14}$ is a propylene group, in view of catalytic activity and easiness in production. Further, the compound of the formula (8) is preferably a compound wherein $R^{15}$ is a hydrogen atom or a methyl group, each of $R^{15}$ and $R^{17}$ is a halogen atom, and $R^{18}$ is a propylene group, in view of catalytic activity and easiness in production.

Specifically, the amine compound of the formula (7) of the present invention may, for example, be 1-{3'-(imidazolinyl)propyl}urea, 1-{3'-(2''-methylimidazolinyl)propyl}urea, 1-{2'-(imidazolinyl)ethyl}urea, 1-{2'-(2''-methylimidazolinyl)ethyl}urea, 1-{2'-(imidazolinyl)-1'-methylethyl}urea or 1-{2'-(2''-methylimidazolinyl)-1'-methylethyl}urea. Among them, more preferred are 1-{3'-(imidazolinyl)propyl}urea and 1-{3'-(2''-methylimidazolinyl)propyl}urea in view of easiness in synthesis.

Specifically, the amine compound of the formula (8) of the present invention may, for example, be 1,3-bis{3'-(imidazolinyl)propyl}urea, 1,3-bis{3'-(2''-methylimidazolinyl)propyl}urea, 1,3-bis{2'-(imidazolinyl)ethyl}urea, 1,3-bis{2'-(2''-methylimidazolinyl)ethyl}urea, 1,3-bis{2'-(imidazolinyl)-1'-methylethyl}urea or 1,3-bis{2'-(2''- methylimidazolinyl)-1'-methylethyl}urea. Among them, more preferred are 1,3-bis{3'-(imidazolinyl)propyl}urea and 1,3-bis{3'-(2"-methylimidazolinyl)propyl}urea in view of easiness in synthesis.

The compounds of the formulae (7) and (8) can be produced, for example, by reacting urea with a 1-(3'-aminopropyl)imidazole in an appropriate molar ratio under heating. Accordingly, the catalyst (E) of the present invention may contain unreacted urea in an amount of up to 20 wt %. The compounds of the formulae (7) and (8) can separately be isolated by means of e.g. chromatography, recrystallization or sublimation.

The amount of the catalyst (E) of the present invention in production of a polyurethane resin is usually from 0.01 to 10 parts by weight per 100 parts by weight of the polyol to be used. It is preferably from 0.05 to 5 parts by weight since if the amount of the catalyst is large, the amount of the catalyst to be incorporated in the polyurethane resin as a terminator tends to be large, whereby physical properties (functional properties) of the resin may decrease.

The catalyst (A), (B) and (D) of the present invention will react with a polyisocyanate which is a material for a polyurethane resin, and fixed in the polyurethane resin skeleton. Further, the fixed catalysts of the present invention will not be decomposed even when exposed to a high temperature. Thus, the catalysts of the present invention will not be present in the form of a free amine in the polyurethane resin, and accordingly, no volatile amine will be discharged.

Further, the catalysts (C) and (E) of the present invention have extremely low volatility and odor. Further, they will react with a polyisocyanate which is a material for a polyurethane resin, and fixed in the polyurethane resin skeleton.

Namely, in a case where the catalysts of the present invention is used, the working environment in production of a polyurethane is improved, and further, it becomes possible to prevent the above-described various problems, such as an odor due to a volatile amine and fogging.

The method for producing a polyurethane resin employing the catalyst of the present invention is a method for obtaining a polyurethane resin product by reacting a polyol with a polyisocyanate in the presence of the catalyst and, if necessary, e.g. a blowing agent, a surfactant or a cross-linking agent. The polyurethane product may, for example, be a flexible polyurethane foam, a semi-rigid polyurethane foam or a rigid polyurethane foam, to be produced by means of a blowing agent, or a polyurethane elastomer product to be produced without using a blowing agent. Among such products, the catalysts of the present invention are applicable preferably to a flexible polyurethane foam, a semi-rigid polyurethane foam or a rigid polyurethane foam, to be produced by means of a blowing agent.

In the polyurethane resin produced by using the catalyst (A) of the present invention, the amount of the volatile amine catalyst is at most 300 μg per g of the polyurethane resin, and it is more preferably at most 100 μg/g in view of environment in an automobile.

Further, in the polyurethane resin produced by using the catalyst (B) of the present invention, the amount of the volatile amine catalyst is at most 20 μg per g of the polyurethane resin.

Here, in the present invention, the amount of the volatile amine catalyst is the total amount of the amine catalyst generated from a polyurethane resin when the polyurethane resin is heated in a methanol solvent at 65° C. for 48 hours.

The polyol to be used in the method for producing a polyurethane resin of the present invention, includes, for example, conventional polyether polyols, polyester polyols, polymer polyols and further flame resisting polyols such as phosphorus-containing polyols or halogen-containing polyols. These polyols may be used alone or in a proper combination as mixed.

The polyether polyols can be produced, for example, by an addition reaction of an alkylene oxide such as ethylene oxide or propylene oxide to a starting material which is a compound having at least two active hydrogen groups, such as a polyhydric alcohol such as ethylene glycol, propylene glycol, glycerol, trimethylol propane or pentaerythritol, an amine such as ethylenediamine, or an alkanolamine such as ethanolamine or diethanolamine, for example, by a method disclosed in "Polyurethane Handbook" edited by Gunter Oertel (1985), Hanser Publishers (Germany), p.42–53.

The polyester polyols may, for example, be those obtainable by a reaction of a dibasic acid with glycol, further a waste during production of nylon as disclosed in "Polyurethane Resin Handbook" edited by Keiji Iwata, (first edition published in 1987), THE NIKKAN KOGYO SHIMBUN, LTD., p.117, trimethylolpropane, a waste of pentaerythritol, a waste of a phthalate type polyester, and polyester polyols derived from treatments of such waste products.

The polymer polyols may, for example, be polymer polyols obtained by reacting the above-mentioned polyether polyol with an ethylenically unsaturated monomer such as butadiene, acrylonitrile or styrene, in the presence of a radical polymerization catalyst.

The flame resisting polyols may, for example, be phosphorus-containing polyols obtainable by adding an alkylene oxide to a phosphoric acid compound, halogen-containing polyols obtainable by ring opening polymerization of epichlorohydrin or trichlorobutylene oxide, and phenol polyols.

These polyols may have molecular weights of from 62 to 15,000.

For flexible polyurethane foams, those having molecular weights of from 1,000 to 15,000 may be used. Preferred are polyether polyols and polymer polyols having molecular weights of from 3,000 to 15,000. If the molecular weight is smaller than 3,000, e.g. physical properties (elasticity) tend to be poor in some cases, and accordingly preferred are ones having molecular weights of at least 3,000. More preferred are flexible polyurethane foams prepared by using polyether polyols and polymer polyols in combination. The polymer polyols have an effect to increase the strength (hardness, elastic properties) of a resin, whereby the molecular design (hardness, elastic properties) becomes easy.

For rigid polyurethane foams, those having molecular weights of from 62 to 8,000 may be used. Preferred are polyether polyols having molecular weights (Mw) of from 62 to 1,500. The polyols for rigid polyurethane foams are preferably those having a large number (4–8) of functional groups and having low molecular weights.

The polyisocyanate to be used in the present invention may be a known polyisocyanate and is not particularly limited, and it may, for example, be an aromatic polyisocyanate such as toluene diisocyanate (TDI), diphenylmethane diisocyanate (MDI), naphthylene diisocyanate or xylylene diisocyanate, an aliphatic polyisocyanate such as hexamethylene diisocyanate, an alicyclic polyisocyanate such as dicyclohexyl diisocyanate or isophorone diisocyanate, or a mixture thereof. As TDI or its derivative, a mixture of 2,4-toluene diisocyanate and 2,6-toluene diisocyanate, or a terminal isocyanate prepolymer derivative of TDI, may be mentioned. As MDI or its derivative, a mixture of MDI and its polymer i.e. a polyphenyl-polymethylene diisocyanate, and/or a terminal isocyanate group-containing diphenylmethane diisocyanate derivative, may be mentioned. Among such organic polyisocyanates, TDI and MDI are preferably employed.

The ratio of such a polyisocyanate to the polyol is not particularly limited, but, as represented by an isocyanate index (i.e. isocyanate groups/active hydrogen groups reactive with isocyanate groups), it is usually within a range of from 60 to 130 for the production of a flexible polyurethane foam or a semi-rigid polyurethane foam and usually within a range of from 60 to 400 for the production of a rigid polyurethane foam or a polyurethane elastomer.

The catalyst to be used for the method for producing a polyurethane resin of the present invention, is the above-mentioned catalyst of the present invention. However, other catalysts may be used in combination within a range not to depart from the present invention. As such other catalysts, for example, conventional organic metal catalysts, tertiary amines or quaternary ammonium salts may be mentioned.

The organic metal catalysts include, for example, stannous diacetate, stannous dioctoate, stannous dioleate, stannous dilaurate, dibutyltin oxide, dibutyltin diacetate, dibutyltin dilaurate, dibutyltin dichloride, dioctyltin dilaurate, lead octanoate, lead naphthenate, nickel naphthenate and cobalt naphthenate.

The tertiary amines may be conventional ones, for example, tertiary amine compounds such as N,N,N',N'-tetramethylethylenediamine, N,N,N',N',-tetramethylpropylenediamine, N,N,N',N'',N''-pentamethyldiethylenetriamine, N,N,N',N'',N''-pentamethyl-(3-aminopropyl)ethylenediamine, N,N,N',N'',N''-pentamethyldipropylenetriamine, N,N,N',N'-tetramethylguanidine, 1,3,5-tris(N,N-dimethylaminopropyl)hexahydro-S-triazine, 1,8-diazabicyclo[5.4.0]undecene-7, triethylenediamine, N,N,N',N'-tetramethylhexamethylenediamine, N-methyl-N'-(2-dimethylaminoethyl)piperazine, N,N'-dimethylpiperazine, dimethylcyclohexylamine, N-methylmorpholine, N-ethylmorpholine, bis(2-dimethylaminoethyl)ether, 1-methylimidazole, 1,2-dimethylimidazole, 1-isobutyl-2-methylimidazole and 1-dimethylaminopropylimidazole. Further, tertiary amine compounds having reactive groups other than the present invention may also be used, such as dimethylethanolamine, dimethylisopropanolamine, N,N-dimethylhexanolamine, dimethylaminoethoxyethanol, N,N-dimethyl-N'-(2-hydroxyethyl)ethylenediamine, N,N-dimethyl-N'-(2-hydroxyethyl)propanediamine, N-methyl-N'-(2-hydroxyethyl)piperazine, bis(dimethylaminopropyl)amine, bis(dimethylaminopropyl)isopropanolamine, 1-(2-hydroxyethyl)imidazole, 1-(2-hydroxypropyl)imidazole, 1-(2-hydroxyethyl)-2-methylimidazole, 1-(2-hydroxypropyl)-2-methylimidazole and 3-quinuclidinol.

The quaternary ammonium salts include, for example, conventional tetraalkylammonium halides such as a tetramethylammonium chloride, tetraalkylammonium hydroxides such as tetramethylammonium hydroxide, and tetraalkylammonium organic acid salts such as a tetramethylammonium 2-ethylhexanoate, a 2-hydroxypropyltrimethylammonium formate and a 2-hydroxypropyltrimethylammonium 2-ethylhexanoate.

The blowing agent to be used for the method for producing a polyurethane resin of the present invention, is water and/or a low boiling point organic compound. The low boiling point organic compound may, for example, be a hydrocarbon compound or a halogenated hydrocarbon compound. The hydrocarbon compound may, for example, be known methane, ethane, propane, butane, pentane or hexane. The halogenated hydrocarbon may, for example, be known halogenated methane, halogenated ethane or fluorinated hydrocarbon, such as methylene chloride, HCFC-141b, HFC-245fa or HFC-356mfc. When such blowing agents are to be used, water and a low boiling point organic compound may be used alone independently or in combination. A particularly preferred blowing agent is water. The amount may vary depending upon the density of the product, but it is usually at least 0.1 part by weight, preferably from 0.5 to 10 parts by weight, per 100 parts by weight of the polyol.

In the present invention, a surfactant may also be employed, as the case requires. As the surfactant to be used in the present invention, a conventional organic silicone type surfactant may be mentioned, and it is used usually in an amount of from 0.1 to 10 parts by weight, per 100 parts by weight of the polyol.

In the present invention, a cross-linking agent or a chain extender may be incorporated, as the case requires. As the cross-liking agent or the chain extender, a polyhydric alcohol having a low molecular weight such as ethylene glycol, 1,4-butanediol or glycerol, an aminepolyol having a low molecular weight such as diethanolamine or triethanolamine or a polyamine such as ethylenediamine, xylylenediamine or methylenebis-orthochloroaniline may, for example, be mentioned. Among them, dimethanolamine or triethanolamine is preferred.

In the method of the present invention, a coloring agent, a flame retardant, an aging-preventive agent or other known additives may also be used, as the case requires. The types and the amounts of such additives may usually be within the commonly employed ranges so long as they will not depart from known manners and procedures.

The product produced by the method of the present invention can be used for various applications, but it is particularly suitable for foam products to be produced by means of a blowing agent. A flexible polyurethane foam may, for example, be applied as a cushion to a bed, a car seat or a mattress. A semi-rigid polyurethane foam may be applied, for example, to an instrumental panel, a headrest or a steering wheel relating to an automobile. A rigid polyurethane foam may be applied, for example, to a refrigerator, a freezer or a heat-insulating building material.

A polyurethane elastomer product may, for example, be applied to an adhesive, a floor material or a waterproofing material.

Now, the present invention will be described in further detail with reference to Examples and Comparative Examples. However, it should be understood that the present invention is by no means restricted to such specific Examples.

EXAMPLES 1 TO 4 AND COMPARATIVE EXAMPLES 1 TO 11

Examples are shown in which high resiliency flexible polyurethane foams were produced by means of the catalyst (A) of the present invention and catalysts of Comparative Examples.

N,N-dimethylpentamethylenediamine, N,N-dimethylhexamethylenediamine, N,N-dimethyloctamethylenediamine and N,N-dimethyldecamethylenediamine were employed as the catalysts of the present invention.

Polyols, water, cross-linking agents and foam stabilizers were mixed in the mixing ratio shown in Table 2 to prepare premix A. 86.6 g of premix A was taken into a 300 ml polyethylene cup, and one of the catalysts (A) of the present invention and the catalysts of Comparative Examples shown in Table 1, was added in an amount such that the reactivity would be 60 seconds as represented by the following gel time, and the temperature was adjusted to 20° C. A polyisocyanate liquid (TM80) having the temperature adjusted to 20° C. in a separate container, was put into the cup of premix A in an amount such that the isocyanate index (molar ratio of isocyanate groups/OH groups×100) would be 105, and quickly stirred by a stirrer at 6,000 rpm for 5 seconds. The mixed solution obtained by stirring was transferred to a 2 l polyethylene cup adjusted to a temperature of 50° C., whereupon the reactivity during foaming was measured. Then, the starting material scale was increased, and the mixed solution was put into a mold (made of aluminum and having an internal size of 35×35×10 cm) adjusted to a temperature of 50° C. in the same manner, so that the total density of the foam would be 45 kg/m³, and after placing a cover, foam molding was carried out. Upon expiration of 5 minutes from the time when the mixed solution was introduced, the foam was removed from the mold. From the molded foam, the moldability of the foam, the curing properties, the total density of the foam, the core density, the amount of the volatized amine catalyst and the odor of the foam, were measured and compared. The results are shown in Table 3.

TABLE 1

Catalyst

N5 [1]
N6 [2]
N8 [3]
N10 [4]
L33 [5]
L33/NEM [6]
PC17 [7]
BDMAPA [8]
N2 [9]
N3 [10]
N12 [11]
N3 carbonate [12]
N6 carbonate [13]
N10 carbonate [14]

[1] N,N-dimethylpentamethylenediamine
[2] N,N-dimethylhexamethylenediamine
[3] N,N-dimethyloctamethylenediamine
[4] N,N-dimethyldecamethylenediamine TABLE 1-continued Catalyst

[5] A dipropylene glycol solution containing 33.3% of triethylene diamine (manufactured by TOSOH CORPORATION)
[6] N-ethylmorpholine (manufactured by TOKYO KASEI KOGYO Co., Ltd.)
[7] N,N,N'-trimethyl-N'-(2-hydroxyethyl)propylenediamine (manufactured by Air Productions and Chemicals)
[8] Tetramethylimino-bis-propylamine (manufactured by Chemical Engineering and Production)
[9] N,N-dimethylethylenediamine
[10] N,N-dimethylaminopropylamine
[11] N,N-dimethylundecamethylenediamine
[12] An aqueous carbonate solution of N3 (70%)
[13] An aqueous carbonate solution of N6 (70%)
[14] An aqueous carbonate solution of N10 (70%)

TABLE 2

|  | Parts by weight (pbw) |
| --- | --- |
| Polyol A [1] | 60 |
| Polyol B [2] | 40 |
| Diethanolamine [3] | 1.0 |
| Triethanolamine [4] | 2.0 |
| Water | 3.20 |
| Foam stabilizer A [5] | 1.0 |
| Foam stabilizer B [6] | 1.0 |
| TM80 [7] | Isocyanate INDEX 105 [8] |

[1] KC-211, polyether polyol, manufactured by Sanyo Kasei K.K. (OH value = 30 mgKOH/g)
[2] FA-728R, polymer polyol, manufactured by Sanyo Kasei K.K. (OH value = 27.5 mgKOH/g)
[3] Cross-linking agent (manufactured by Kanto Kagaku K.K.)
[4] Cross-linking agent (manufactured by Kanto Kagaku K.K.)
[5] Silicone type surfactant, manufactured by Toray Silicone K.K.)
[6] Silicone type surfactant, manufactured by Nippon UNICAR CO LTD)
[7] A blend product of TDI:T-80 (manufactured by Nippon Polyurethane K.K.) and MDI:MR200 (manufactured by Nippon Polyurethane K.K.) in a ratio of 80/20
[8] INDEX = (mols of NCO groups/mols of OH groups) × 100

TABLE 3

|  | Example | | | | Comparative Example | | | |
| --- | --- | --- | --- | --- | --- | --- | --- | --- |
|  | 1 | 2 | 3 | 4 | 1 | 2 | 3 | 4 |
| Amount of catalyst (pbw) | | | | | | | | |
| N5 | 0.73 | | | | | | | |
| N6 | | 0.71 | | | | | | |
| N8 | | | 0.77 | | | | | |
| N10 | | | | 0.84 | | | | |
| L33 | | | | | 0.88 | | | |
| L33/NEM | | | | | | 0.82/ 0.82 | | |
| PC17 | | | | | | | 0.98 | |
| BDMAPA | | | | | | | | 1.15 |
| N2 | | | | | | | | |
| N3 | | | | | | | | |
| N12 | | | | | | | | |
| N3 carbonate | | | | | | | | |
| N6 carbonate | | | | | | | | |

TABLE 3-continued

| N10 carbonate Reactivity (sec) | | | | | | | | |
|---|---|---|---|---|---|---|---|---|
| Cream time | 12 | 12 | 11 | 11 | 9.5 | 10.5 | 10 | 9.5 |
| Gel time | 60 | 60 | 60 | 60 | 60 | 60 | 60 | 60 |
| Rise time | 80 | 80 | 80 | 85 | 85 | 72 | 85 | 85 |
| Physical properties of the foam | | | | | | | | |
| Mold total density (kg/m³) | 45.1 | 44.7 | 45.1 | 45.5 | 45.3 | 44.8 | 45.5 | 45.3 |
| Mold core density (kg/m³) | 44.2 | 42.5 | 44.3 | 41.9 | 43.6 | 43.6 | 41.9 | 43.6 |
| Amount of volatized amine catalyst (μg/g) | At most 20 | At most 20 | 220 | 290 | 1140 | 3980 | 1410 | 2216 |
| Moldability of foam | ○ | ○ | ○ | ○ | ○ | ⊚ | ○ | ○ |
| Curing properties of foam | ○ | ○ | ○ | ○ | ○ | ○ | ○ | ○ |
| Odor of foam | ○ | ○ | Δ | Δ | X | X | X | X |

| | Comparative Example | | | | | | |
|---|---|---|---|---|---|---|---|
| | 5 | 6 | 7 | 8 | 9 | 10 | 11 |
| Amount of catalyst (pbw) | | | | | | | |
| N5 | | | | | | | |
| N6 | | | | | | | |
| N8 | | | | | | | |
| N10 | | | | | | | |
| L33 | | | | | | | |
| L33/NEM | | | | | | | |
| PC17 | | | | | | | |
| BDMAPA | | | | | | | |
| N2 | 1.16 | | | | | | |
| N3 | | 0.87 | | | | | |
| N12 | | | 0.88 | | | | |
| N3 carbonate | | | | 2.86 | | | |
| N6 carbonate | | | | | 2.33 | | 1.23 |
| N10 carbonate | | | | | | 2.76 | |
| Reactivity (sec) | | | | | | | |
| Cream time | 9 | 10.5 | 12 | 9 | 10 | 11 | 14 |
| Gel time | 60 | 60 | 60 | 60 | 60 | 60 | 106 |
| Rise time | 77 | 72 | 86 | 76 | 80 | 86 | 158 |
| Physical properties of the foam | | | | | | | |
| Mold total density (kg/m³) | 44.2 | 44.8 | 45.3 | 44.9 | 45.1 | 45.1 | 45.0 |
| Mold core density (kg/m³) | 43.2 | 43.6 | 43.6 | 41.5 | 42.6 | 42.8 | 42.8 |
| Amount of volatized amine catalyst (μg/g) | At most 20 | At most 20 | 580 | 980 | 1380 | 1670 | 320 |
| Moldability of foam | Δ | Δ | ○ | Δ | ○ | ○ | ○ |
| Curing properties of foam | X | X | ○ | X | Δ | Δ | X |
| Odor of foam | ○ | ○ | X | X | X | X | Δ |

The measuring methods for the respective measured items were as follows.

Measurement of the Reactivity

Cream time: Foaming initiation time, the time until the foam started to rise, was visually measured.

Gel time: As the reaction proceeded, the time until the liquid substance was changed to the resin substance, was measured.

Rise time: The time until the rise of foam terminated, was measured by visual observation.

Moldability of the foam

The cellular roughing at the surface portion of the molded foam was visually inspected and evaluated as the moldability as follows.

⊚: No cell roughing observed.

○: Cell roughing partially observed.

Δ: Cell roughing observed over about one half of the surface portion.

x: Cell roughing observed over the entire area of the surface portion.

Curing Properties of the Foam

Immediately after the removal from the mold, a load of about 2 kg was placed on the foam for 5 seconds every 30 seconds, and the time until no dent on the foam remained was recorded (measurement of the curing rate) and evaluated as the curing properties as follows.

○: Dent disappearance time within 6 minutes.

Δ: Dent disappearance time of from 6 to 8 minutes.

x: Dent disappearance time of at least 8 minutes.

Foam core density

The center portion of the molded foam was cut into a size of 20×20×5 cm, and the size and the weight were accurately measured, whereby the core density was calculated.

Amount of remaining amine catalyst

The amine catalyst in the foam was quantitatively analyzed by extraction with a methanol solvent under heating.

Namely, a foam having a size of 1.5×1.5×5 cm was cut out from the foam, of which the foam core density was measured, and put into a pressure resistant container of 20 ml together with methanol. This container was left to stand in an oven of 65° C. for 48 hours. After the 48 hours, no change in weight of the container was confirmed, and then the amine catalyst was quantitatively analyzed by gas chromatography. The quantified value was represented by μg of the amine catalyst per g of the foam.

Odor of the Foam

From the foam, of which the foam core density was measured, a foam having a size of 5×5×5 cm was cut out and put into a mayonnaise bottle, and a cover was put thereon. Then, the odor of the foam was smelled by ten monitors, and the intensity of the odor was measured.

○: No substantial odor smelled.
Δ: Slight odor smelled.
×: Strong odor smelled.

In Examples 1 to 4, polyurethane foams obtained by using the catalysts of the present invention, have a volatile amine catalyst content of so low as at most 300 μg/g, whereby the foams have a weak odor. Particularly in Examples 1 and 2, substantially no amine catalyst remains, whereby the foams have no amine odor, and in addition, the catalytic activity is extremely high. Further, the moldabilities and the curing properties of the foams are good, which contributes to the productivity of the foams.

Whereas, in Comparative Examples 1 and 2 which are examples for a tertiary amine catalyst having no reactive group in its molecule, a volatile amine catalyst remains in a large amount in the foam, whereby the foam has a strong odor.

In Comparative Example 3 which is an example for an amine catalyst having a hydroxyethyl group in its molecule, a volatile amine catalyst remains in a large amount in the foam, whereby the foam has a strong odor.

In Comparative Example 4 which is an example for an amine catalyst having a reactive secondary amino group in its molecule, a volatile amine catalyst remains in a large amount in the foam, whereby the foam has a strong odor.

In Comparative Examples 5 and 6 which are examples for an amine catalyst having a short carbon chain and having a reactive primary amino group in its molecule, the volatile amine catalyst content is at most 20 μg/g and substantially no catalyst remains, whereby the polyurethane foam has no amine odor. However, the catalytic activity is low, whereby a large amount of the catalyst is required, and in addition, the foam physical properties significantly decrease, and further, the moldability and the curing properties of the foam tend to be poor, whereby the productivity of the foam tends to be poor.

In Comparative Example 7 which is an example for an amine catalyst having a long carbon chain and having a reactive primary amino group in its molecule, a volatile amine catalyst remains in a large amount in the foam, whereby the foam has a strong odor. Further, the catalytic activity is low, whereby a large amount of the catalyst is required.

In Comparative Examples 8 to 10 which are examples for a catalyst which is a carbonate of an amine having a reactive primary amino group in its molecule, a volatile amine catalyst remains in a large amount in the foam, whereby the foam has a strong odor. Further, the catalytic activity is low, whereby a large amount of the catalyst is required.

In Comparative Example 11 which is an example for a catalyst which is a carbonate of an amine having a reactive primary amino group in its molecule, the amine amount of which adjusted to be the same as in Example 2, the catalyst is insufficient, whereby the curing properties are significantly poor, and a slight amount of a volatile amine catalyst remains in the foam, whereby the foam has an amine odor.

PREPARATION EXAMPLE 1

Preparation of a Solution Containing 32.8% of 3-aminoquinuclidine 40.0 g of a 30% caustic soda aqueous solution was added to 5.5 g of 3-aminoquinuclidine dihydrochloride, followed by stirring at room temperature. The solution thus obtained was extracted with 30.0 g of benzene twice to obtain an upper layer, which was evaporated to obtain a solution, and 6.6 g of dipropylene glycol was added to 4.40 g of the solution. Purity of the solution thus obtained was analyzed by carrying out an amine value analysis and gas chromatography analysis, whereupon it was 32.8%.

EXAMPLE 5 AND COMPARATIVE EXAMPLES 12 TO 16

Examples are shown in which high resiliency flexible polyurethane foams were produced by means of the catalyst (B) of the present invention and catalysts of Comparative Examples. As the catalyst, 32.8% of 3-aminoquinuclidine (3-AQ) was used in Example 5, and 33.3% of triethylenediamine (L33), N,N,N'-trimethyl-N'-(2-hydroxyethyl)propylenediamine (PC17), tetramethylimino-bis-propylamine (BDMAPA) and dimethylaminopropylamine (DMAPA) were used in Comparative Examples.

Polyols, water, cross-linking agents and foam stabilizers were mixed in the mixing ratio shown in Table 4 to prepare premix A. 86.6 g of premix A was taken into a 300 ml polyethylene cup, and one of the catalysts (B) of the present invention and the catalysts of Comparative Examples shown in Table 5, was added in an amount such that the reactivity would be 60 seconds as represented by the following gel time, and the temperature was adjusted to 20° C. A polyisocyanate liquid (TM80) having the temperature adjusted to 20° C. in a separate container, was put into the cup of premix A in an amount such that the isocyanate index (molar ratio of isocyanate groups/OH groups×100) would be 105, and quickly stirred by a stirrer at 6,000 rpm for 5 seconds. The mixed solution obtained by stirring was transferred to a 2 l polyethylene cup adjusted to a temperature of 50° C., whereupon the reactivity during foaming was measured. Then, the starting material scale was increased, and the mixed solution was put into a mold (made of aluminum and having an internal size of 35×35×10 cm) adjusted to a temperature of 50° C. in the same manner, so that the total density of the foam would be 45 kg/m$^3$, and after placing a cover, foam molding was carried out. Upon expiration of 5 minutes from the time when the mixed solution was introduced, the foam was removed from the mold. From the molded foam, the moldability of the foam, the curing properties, the total density of the foam, the core density, the amount of the volatized amine catalyst and the odor of the foam, were measured and compared. The results are shown in Table 5.

TABLE 4

|  | Parts by weight (pbw) |
| --- | --- |
| Polyol A [1] | 60 |
| Polyol B [2] | 40 |
| Diethanolamine [3] | 1.0 |
| Triethanolamine [4] | 2.0 |
| Water | 3.20 |
| Foam stabilizer A [5] | 1.0 |
| Foam stabilizer B [6] | 1.0 |
| TM80 [7] | Isocyanate INDEX 105 [8] |

[1] KC-211, polyether polyol, manufactured by Sanyo Kasei K.K. (OH value = 30 mgKOH/g)
[2] FA-728R, polymer polyol, manufactured by Sanyo Kasei K.K. (OH value = 27.5 mgKOH/g)
[3] Cross-linking agent (manufactured by Kanto Kagaku K.K.)
[4] Cross-linking agent (manufactured by Kanto Kagaku K.K.)
[5] Silicone type surfactant, manufactured by Toray Silicone K.K.)
[6] Silicone type surfactant, manufactured by Nippon UNICAR CO LTD)
[7] A blend product of TDI:T-80 (manufactured by Nippon Polyurethane K.K.) and MDI:MR200 (manufactured by Nippon Polyurethane K.K.) in a ratio of 80/20
[8] INDEX = (mols of NCO groups/mols of OH groups) × 100

TABLE 5

|  | Example 5 | Comparative Example 12 | Comparative Example 13 | Comparative Example 14 | Comparative Example 15 |
| --- | --- | --- | --- | --- | --- |
| Amount of catalyst (pbw) | | | | | |
| 3-AQ [1] | 0.95 | | | | |
| L33 [2] | | 0.88 | | | |
| PC17 [3] | | | 0.98 | | |
| BDMAPA [4] | | | | 1.15 | |
| DMAPA [5] | | | | | 0.87 |
| Reactivity (sec) | | | | | |
| Cream time | 13 | 12 | 10.5 | 10 | 11 |
| Gel time | 60 | 60 | 60 | 60 | 60 |
| Rise time | 81 | 82 | 85 | 85 | 81 |
| Physical properties of the foam | | | | | |
| Mold total density (kg/m³) | 45.2 | 44.7 | 45.5 | 45.3 | 44.8 |
| Mold core density (kg/m³) | 44.3 | 42.5 | 41.9 | 43.6 | 43.6 |
| Amount of volatized amine catalyst (μg/g) | At most 20 | 1140 | 1410 | 2216 | At most 20 |
| Moldability of foam | ○ | ○ | ○ | ○ | Δ |
| Curing properties of foam | ○ | ○ | ○ | ○ | X |
| Odor of foam | ○ | X | X | X | ○ |

[1] A dipropylene glycol solution containing 32.8% of 3-aminoquinuclidine
[2] A dipropylene glycol solution containing 33.3% of triethylenediamine (manufactured by TOSOH CORPORATION)
[3] N,N,N'-trimethyl-N'-(2-hydroxyethyl)propylenediamine
[4] Tetramethylimino-bis-propylamine
[5] Dimethylaminopropylamine The measuring methods for the respective measured items were as follows.

Measurement of the Reactivity

Cream time: Foaming initiation time, the time until the foam started to rise, was visually measured.

Gel time: As the reaction proceeded, the time until the liquid substance was changed to the resin substance, was measured.

Rise time: The time until the rise of foam terminated, was measured by visual observation.

Moldability of the Foam

The cellular roughing at the surface portion of the molded foam was visually inspected and evaluated as the moldability as follows.
  ○: Cell roughing partially observed.
  Δ: Cell roughing observed over about one half of the surface portion.
  x: Cell roughing observed over the entire area of the surface portion.

Curing Properties of the Foam

Immediately after the removal from the mold, a load of about 2 kg was placed on the foam for 5 seconds every 30 seconds, and the time until no dent on the foam remained was recorded (measurement of the curing rate) and evaluated as the curing properties as follows.
  ○: Dent disappearance time within 6 minutes.
  Δ: Dent disappearance time of from 6 to 8 minutes.
  x: Dent disappearance time of at least 8 minutes.

Foam Core Density

The center portion of the molded foam was cut into a size of 20×20×5 cm, and the size and the weight were accurately measured, whereby the core density was calculated.

Amount of Remaining Amine Catalyst

The amine catalyst in the foam was quantitatively analyzed by extraction with a methanol solvent under heating. Namely, a foam having a size of 1.5×1.5×5 cm was cut out from the foam, of which the foam core density was measured, and put into a pressure resistant container of 20 ml together with methanol. This container was left to stand in an oven of 65° C. for 48 hours. After the 48 hours, no change in weight of the container was confirmed, and then the amine catalyst was quantitatively analyzed by gas chromatography. The quantified value was represented by μg of the amine catalyst per g of the foam.

Odor of the Foam

From the foam, of which the foam core density was measured, a foam having a size of 5×5×5 cm was cut out and put into a mayonnaise bottle, and a cover was put thereon. Then, the odor of the foam was smelled by ten monitors, and the intensity of the odor was measured.
  ○: No substantial odor smelled.
  Δ: Slight odor smelled.
  x: Strong odor smelled.

As is evident from Example 5, a polyurethane foam obtained by using the catalyst of the present invention has a volatile amine catalyst content of not more than 20 μg/g and substantially no amine catalyst remains, whereby the foam has no amine odor. Further, the catalytic activity is extremely high and at the same level as that of triethylenediamine (Comparative Example 12) which is conventionally used for flexible polyurethane foams. Further, the moldability and curing properties of the foam are good, which contributes to the productivity of the foam.

Whereas, in Comparative Example 12 which is an example for a tertiary amino catalyst having no reactive group in its molecule, a volatile amine catalyst remains in a large amount in the foam, whereby the foam has a strong odor. In Comparative Example 13 which is an Example for an amine catalyst having a hydroxyethyl group in its molecule, a volatile amine catalyst is discharged in a large amount from the foam. In Comparative Example 14 which is an example for an amine catalyst having a reactive secondary amino groups in its molecule, a volatile amine catalyst is discharged in a large amount from the foam. In Comparative Example 15 which is an example for an amine catalyst having a primary amino group in its molecule, the volatile amine catalyst content is at most 20 μg/g and substantially no amine catalyst remains in the polyurethane foam, whereby the foam has no amine odor in the same manner as in Example 5. However, the moldability and the curing properties of the foam are poor, whereby productivity of the foam is poor.

PREPARATION EXAMPLE 2

Preparation of a Solution Containing 33.3% of a Quinuclidinyl Urea Composition 160.0 g of a 30% caustic soda aqueous solution was added to 22.0 g of 3-aminoquinuclidine dihydrochloride, followed by stirring at room temperature. The solution thus obtained was extracted with 80.0 g of benzene twice to obtain an upper solution, which was evaporated to obtain a solution. 6.9 g of urea was added to 17.6 g of the solution (the amount of 3-aminoquinuclidine: 14.4 g). The solution thus obtained was reacted at 160° C. for 8 hours, and after the reaction, a volatile component was removed to obtain 19.3 g of a 3-quinuclidinyl urea composition. 38.6 g of dipropylene glycol was added thereto and subjected to a foaming test. The composition of the solution is shown in Table 6.

EXAMPLE 6 AND COMPARATIVE EXAMPLES 16 TO 19

Examples are shown in which high resiliency flexible polyurethane foams were produced by means of the catalyst (C) of the present invention and catalysts of Comparative Examples. As the catalysts, 33.3% of 3-aminoquinuclidinyl urea composition (QU33) obtained in Preparation Example 2 was used in Example 6, and 33.3% of triethylenediamine (L33), N-(3-dimethylaminopropyl)-urea (urea A), N,N'-bis(3-dimethylaminopropyl)-urea (urea B) and dimethylaminopropylamine (DMAPA) were used in Comparative Examples 16 to 19, respectively.

Polyols, water, cross-linking agents and foam stabilizers were mixed in the mixing ratio shown in Table 8 to prepare premix A. 86.6 g of premix A was taken into a 300 ml polyethylene cup, and one of the catalyst of the present invention and the catalysts of Comparative Examples shown in Table 7, was added in an amount such that the reactivity would be 60 seconds as represented by the following gel time, and the temperature was adjusted to 20° C. A polyisocyanate liquid (TM80) having the temperature adjusted to 20° C. in a separate container, was put into the cup of premix A in an amount such that the isocyanate index (molar ratio of isocyanate groups/OH groups×100) would be 105, and quickly stirred by a stirrer at 6,000 rpm for 5 seconds. The mixed solution obtained by stirring was transferred to a 2 l polyethylene cup adjusted to a temperature of 50° C., whereupon the reactivity during foaming was measured. Then, the starting material scale was increased, and the mixed solution was put into a mold (made of aluminum and having an internal size of 35×35×10 cm) adjusted to a temperature of 50° C. in the same manner, so that the total density of the foam would be 45 kg/m³, and after placing a cover, foam molding was carried out. Upon expiration of 5 minutes from the time when the mixed solution was introduced, the foam was removed from the mold. From the molded foam, the total density of the foam, the core density and the odor of the foam, were measured and compared. Further, the odor of the catalyst was measured. The results are shown in Table 9.

TABLE 6

| Catalyst | wt % |
|---|---|
| 3-Quinuclidinylurea | 28.0 |
| Bis(3-quinuclidinyl)-urea | 4.0 |
| Urea | 1.3 |
| Dipropylene glycol | 66.7 |

TABLE 7

| Catalyst |
|---|
| QU33 [1] |
| L33 [2] |
| Urea A [3] |
| Urea B [4] |
| DMAPA [5] |

[1] A dipropylene glycol solution containing 33.3% of a quinuclidinylurea composition
[2] A dipropylene glycol solution containing 33.3% of triethylenediamine
[3] N-(3-dimethylaminopropyl)-urea
[4] N,N'-bis(3-dimethylaminopropyl)-urea
[5] 3-(dimethylamino)-propylamine

TABLE 8

| | Parts by weight (pbw) |
|---|---|
| Polyol A [1] | 60 |
| Polyol B [2] | 40 |
| Diethanolamine [3] | 1.0 |
| Triethanolamine [4] | 2.0 |
| Water | 3.20 |
| Foam stabilizer A [5] | 1.0 |
| Foam stabilizer B [6] | 1.0 |
| Connecting agent [7] | 0–2.0 |
| TM80 [8] | Isocyanate INDEX 105 [9] |

[1] KC-211, polyether polyol, manufactured by Sanyo Kasei K.K. (OH value = 30 mgKOH/g)
[2] FA-728R, polymer polyol, manufactured by Sanyo Kasei K.K. (OH value = 27.5 mgKOH/g)
[3] Cross-linking agent (manufactured by Kanto Kagaku K.K.)
[4] Cross-linking agent (manufactured by Kanto Kagaku K.K.)
[5] Silicone type surfactant, manufactured by Toray Silicone K.K.)
[6] Silicone type surfactant, manufactured by Nippon UNICAR CO LTD)
[7] NEF024 (manufactured by Nippon Polyurethane K.K.)
[8] A blend product of TDI:T-80 (manufactured by Nippon Polyurethane K.K.) and MDI:MR200 (manufactured by Nippon Polyurethane K.K.) in a ratio of 80/20
[9] INDEX = (mols of NCO groups/mols of OH groups) × 100

TABLE 9

| | | Comparative Example | | | |
|---|---|---|---|---|---|
| | Example 6 | 16 | 17 | 18 | 19 |
| Amount of catalyst (pbw) | | | | | |
| QU33 | 1.10 | | | | |
| L33 | | 0.88 | | | |
| Urea A | | | 1.00 | | |
| Urea B | | | | 1.13 | |
| DMAPA | | | | | 0.87 |
| Reactivity (sec) | | | | | |
| Cream time | 13 | 12 | 10.5 | 10.5 | 10.5 |
| Gel time | 60 | 60 | 60 | 60 | 60 |
| Rise time | 79 | 82 | 74 | 73 | 72 |
| Catalyst | | | | | |
| Odor of catalyst | ○ | X | ○ | Δ | X |

TABLE 9-continued

|  | Example 6 | Comparative Example | | | |
|---|---|---|---|---|---|
|  |  | 16 | 17 | 18 | 19 |
| Physical properties of the foam |  |  |  |  |  |
| Mold total density (kg/m³) | 45.0 | 44.7 | 44.8 | 45.1 | 44.8 |
| Mold core density (kg/m³) | 43.9 | 42.5 | 43.4 | 43.9 | 43.6 |
| Odor of foam | ○ | X | ○ | ○ | ○ |

The measuring methods for the respective measured items were as follows.

Measurement of the Reactivity

Cream time: Foaming initiation time, the time until the foam started to rise, was visually measured.

Gel time: As the reaction proceeded, the time until the liquid substance was changed to the resin substance, was measured.

Rise time: The time until the rise of foam terminated, was measured by visual observation.

Odor of the Catalyst 10 g of the catalyst was put in a sample bottle of 20 ml, and the odor was smelled by ten monitors with a distance of 10 cm between the sample and their noses, and the intensity of the odor was measured.

○: No substantial odor smelled.
Δ: Odor distinctly smelled.
x: Strong odor smelled.

Foam Core Density

The center portion of the molded foam was cut into a size of 20×20×5 cm, and the size and the weight were accurately measured, whereby the core density was calculated.

Odor of the Foam

From the foam, of which the foam core density was measured, a foam having a size of 5×5×5 cm was cut out and put into a mayonnaise bottle, and a cover was put thereon. Then, the odor of the foam was smelled by ten monitors, and the intensity of the odor was measured.

○: No substantial odor smelled.
Δ: Slight odor smelled.
x: Strong odor smelled.

In Example 6 which is an Example wherein a 33.3% product of the catalyst (C) of the present invention was used, the amine catalyst has substantially no odor. In addition, the catalytic activity is at the same level as that of Comparative Examples 17 to 19 wherein the catalysts are 100% products, and the activity is close to that of a highly active catalyst triethylenediamine (Comparative Example 16) which is conventionally used for production of flexible polyurethane foams.

Whereas, in Comparative Example 16 which is an example of a tertiary amine catalyst having no reactive group in its molecule, an odor of the amine catalyst is smelled. Further, the foam has an amine odor. In Comparative Example 17 which is an example for an amine catalyst having a ureide group ($CONH_2$) in its molecule, although substantially no odor of the amine catalyst is smelled, the catalytic activity is low. In Comparative Example 18 which is an example for an amine catalyst having a urea group (NHCONH) in its molecule, an odor of the amine catalyst is smelled, and the catalytic activity is low. In Comparative Example 19 which is an example for an amine catalyst having a primary amino group in its molecule, a noisome odor of the amine catalyst is smelled.

EXAMPLE 7 AND COMPARATIVE EXAMPLES 20 TO 23

Examples are shown in which rigid polyurethane foams were produced by means of the catalyst (C) of the present invention and catalysts of Comparative Examples. As the catalysts, 33.3% of 3-aminoquinuclidinyl urea composition (QU33) obtained in Preparation Example 2 was used in Example 7, and 33.3% of triethylenediamine (L33), N-(3-dimethylaminopropyl)-urea (urea A), N,N'-bis(3-dimethylaminopropyl)-urea (urea B) and dimethylethanolamine (DMEA) were used in Comparative Examples 21 to 24, respectively.

Polyols, water, a foam stabilizer and a blowing agent were mixed in the mixing ratio shown in Table 11 to prepare premix B. 48.6 g of premix B was taken into a 300 ml polyethylene cup, and one of the catalyst (C) of the present invention and the catalysts of Comparative Examples shown in Table 10, was added in an amount such that the reactivity would be 60 seconds as represented by the following gel time, and the temperature was adjusted to 20° C. A polyisocyanate liquid (MR-200) having the temperature adjusted to 20° C. in a separate container, was put into the cup of premix B in an amount such that the isocyanate index (molar ratio of isocyanate groups/OH groups×100) would be 110, and quickly stirred by a stirrer at 6,500 rpm for 3 seconds. The mixed solution obtained by stirring was transferred to a 2 l polyethylene cup adjusted to a temperature of 40° C., whereupon the reactivity during foaming was measured. From the molded foam, the core density, the appearance of the foam and the odor of the foam, were measured and compared. Further, the odor of the catalyst was measured. The results are shown in Table 12.

TABLE 10

| Catalyst |
|---|
| QU33 [1] |
| L33 [2] |
| Urea A [3] |
| Urea B [4] |
| DMEA [5] |

[1] A dipropylene glycol solution containing 33.3% of a quinuclidinylurea composition
[2] A dipropylene glycol solution containing 33.3% of triethylenediamine
[3] N-(3-dimethylaminopropyl)-urea
[4] N,N'-bis(3-dimethylaminopropyl)-urea
[5] Dimethylethanolamine

TABLE 11

|  | Parts by weight (pbw) |
|---|---|
| Polyol C [1] | 50 |
| Polyol D [2] | 50 |
| Water | 1.8 |
| Foam stabilizer [3] | 1.5 |
| Blowing agent [4] | 30 |
| c-MDI [5] | Isocyanate INDEX 110 [6] |

[1] SU-464, polyether polyol, manufactured by Mitsui Chemicals (OH value = 450 mgKOH/g)
[2] NT-400, polyether polyol, manufactured by Mitsui Chemicals (OH value = 390 mgKOH/g)
[3] SZ-1627, silicone type surfactant, manufactured by Nippon UNICAR CO LTD
[4] HCFC-141b, manufactured by CENTRAL GLASS CO., LTD.
[5] MDI:MR200, manufactured by Nippon Polyurethane K.K.
[6] INDEX = (mols of NCO groups/mols of OH groups) × 100

TABLE 12

|  | Example 7 | Comparative Example 20 | 21 | 22 | 23 |
|---|---|---|---|---|---|
| Amount of catalyst (pbw) | | | | | |
| QU33 | 3.3 | | | | |
| L33 | | 2.6 | | | |
| Urea A | | | 3.0 | | |
| Urea B | | | | 3.4 | |
| DMEA | | | | | 3.7 |
| Reactivity (sec) | | | | | |
| Cream time | 19 | 20 | 10 | 11 | 14 |
| Gel time | 60 | 59 | 60 | 60 | 60 |
| Tack free time | 76 | 70 | 78 | 79 | 84 |
| Rise time | 94 | 95 | 90 | 90 | 97 |
| Catalyst | | | | | |
| Odor of catalyst | ○ | X | ○ | Δ | X |
| Physical properties of the foam | | | | | |
| Free core density (kg/m$^3$) | 27.6 | 27.6 | 25.4 | 25.6 | 25.4 |
| Appearance of foam | ○ | ○ | ○ | ○ | Δ |
| Odor of foam | ○ | X | ○ | ○ | ○ |

The measuring methods for the respective measured items were as follows.

Measurement of the Reactivity

Cream time: Foaming initiation time, the time until the foam started to rise, was visually measured.

Gel time: As the reaction proceeded, the time until the liquid substance was changed to the resin substance, was measured.

Tack free time: The time until tackiness on the surface of the foam disappeared was measured.

Rise time: The time until the rise of foam terminated, was measured by visual observation.

Odor of the Catalyst 10 g of the catalyst was put in a sample bottle of 20 ml, and the odor was smelled by ten monitors with a distance of 10 cm between the sample and their noses, and the intensity of the odor was measured.

○: No substantial odor smelled.
Δ: Odor distinctly smelled.
x: Strong odor smelled.

Foam Core Density

The center portion of the molded foam was cut into a size of 10×10×5 cm, and the size and the weight were accurately measured, whereby the core density was calculated.

Appearance of the Foam

One hour after the completion of the foaming, the complete foam was taken out from the 2 l polyethylene cup, and the cell roughening at the surface portion of the foam was visually inspected.

○: Substantially no cell roughening observed.
Δ: Slight cell roughening observed.
x: Cell roughening observed over the entire area.

Odor of the Foam

From the foam, of which the foam core density was measured, a foam having a size of 5×5×5 cm was cut out and put into a mayonnaise bottle, and a cover was put thereon. Then, the odor of the foam was smelled by ten monitors, and the intensity of the odor was measured.

○: No substantial odor smelled.
Δ: Slight odor smelled.
x: Strong odor smelled.

In Example 7 which is an Example wherein a 33.3% product of the catalyst (C) of the present invention was used, the amine catalyst has substantially no odor. In addition, the catalytic activity is at the same level as that of Comparative Examples 21 to 23 wherein the catalysts are 100% products, and the activity is close to that of triethylenediamine (Comparative Example 20) which shows a high catalytic activity.

Whereas, in Comparative Example 20 which is an example of a tertiary amine catalyst having no reactive group in its molecule, an odor of the amine catalyst is smelled. Further, the foam has an amine odor. In Comparative Example 21 which is an example for an amine catalyst having a ureide group ($CONH_2$) in its molecule, although substantially no odor of the amine catalyst is smelled, the catalytic activity is low. In Comparative Example 22 which is an example for an amine catalyst having a urea group (NHCONH) in its molecule, an odor of the amine catalyst is smelled, and the catalytic activity is low. In Comparative Example 23 which is an example for an amine catalyst having a primary amino group in its molecule, a noisome odor of the amine catalyst is smelled.

EXAMPLES 8 TO 12 AND COMPARATIVE EXAMPLES 25 TO 32

Examples are shown in which semi-rigid polyurethane foams were produced by means of the catalyst (D) of the present invention and catalysts of Comparative Examples.

Polyol E, water and triethanolamine were mixed in the mixing ratio shown in Table 13 to obtain premix (C). 105.8 g of premix C was taken into a 300 ml polyethylene cup, and one of the catalyst (D) of the present invention and the catalysts of Comparative Examples shown in Table 14, was added in an amount such that the reactivity would be 50 seconds as represented by the following gel time, and the temperature was adjusted to 20° C. An isocyanate liquid having the temperature adjusted to 20° C. in a separate container, was put into the cup of premix C in an amount of 61.5 g with which the isocyanate index (molar ratio of isocyanate groups/OH groups×100) would be 105, and quickly stirred by a stirrer at 6,000 rpm for 5 seconds. The mixed solution obtained by stirring was transferred to a 2 l polyethylene cup adjusted to a temperature of 40° C., whereupon the reactivity during foaming was measured.

Then, in the same manner at the same scale, the mixed solution was put into a mold (made of aluminum and having an internal size of 200×200×15 mm) adjusted to a temperature of 40° C. from its edge, and after placing a cover, foam molding was carried out. Upon expiration of 2 minutes from the time when the mixed solution was introduced, the foam was removed from the mold. From the molded foam, the hardness of the foam at the time of the removal from the mold, the moldability of the foam, the total density of the foam, the amount of the volatized amine catalyst and the odor of the foam, were measured and compared. The results are shown in Table 14.

TABLE 13

|  | Parts by weight (pbw) |
| --- | --- |
| Polyol E [1] | 100 |
| Triethanolamine [2] | 3 |
| Water | 2.8 |
| Catalyst | Varies |

TABLE 13-continued

|  | Parts by weight (pbw) |
| --- | --- |
| Isocyanate A [3] | Isocyanate INDEX 105 [4] |

[1] FA703, polyether polyol, manufactured by Sanyo Kasei K.K. (OH value = 34 mgKOH/g)
[2] Cross-linking agent (manufactured by Kanto Kagaku K.K.)
[3] D-MDI:MR200 (manufactured by Nippon Polyurethane K.K.)
[4] INDEX = (mols of NCO groups/mols of OH groups) × 100

TABLE 14

|  | Example | | | | |
| --- | --- | --- | --- | --- | --- |
|  | 8 | 9 | 10 | 11 | 12 |
| Amount of catalyst (pbw) | | | | | |
| 2MIZPO [5] | 0.45 | 0.45 | 0.27 | | |
| IZPO [6] | | | | 0.60 | |
| IZPA [7] | | | | | 0.40 |
| DETAPO [8] | 0.50 | | 0.65 | 0.50 | |
| DMAEO [9] | | 0.38 | | | 0.38 |
| L33 [10] | | | | | |
| ET [11] | | | | | |
| DMAPA [12] | | | | | |
| BDMAPA [13] | | | | | |
| TMAEEA [14] | | | | | |
| Reactivity (sec) | | | | | |
| Cream time | 15 | 14 | 13 | 13 | 12 |
| Gel time | 50 | 49 | 49 | 50 | 49 |
| Rise time | 71 | 72 | 69 | 71 | 69 |
| Physical properties of the foam | | | | | |
| Foam density in the mold (kg/m³) | 122 | 120 | 118 | 120 | 118 |
| Amount of volatized amine catalyst (μg/g) | 49 | 37 | 43 | 41 | 42 |
| Hardness of foam at the time of removal from the mold (Shore C) | 13 | 12 | 13 | 13 | 13 |
| Moldability of foam | ◯ | ◯ | ◯ | ◯ | ◯ |
| Odor of foam | ◎ | ◎ | ◎ | ◎ | ◎ |

|  | Comparative Example | | | | | | | |
| --- | --- | --- | --- | --- | --- | --- | --- | --- |
|  | 24 | 25 | 26 | 27 | 28 | 29 | 30 | 31 |
| Amount of catalyst (pbw) | | | | | | | | |
| 2MIZPO [5] | | | | | | 1.60 | | |
| IZPO [6] | | | | | | | | |
| IZPA [7] | | | | | | | | |
| DETAPO [8] | | | | | | | 0.80 | |
| DMAEO [9] | | | | | | | | 0.58 |
| L33 [10] | 0.85 | | | | | | | |
| ET [11] | | 0.33 | | | | | | |
| DMAPA [12] | | | 1.00 | | | | | |
| BDMAPA [13] | | | | 1.25 | | | | |
| TMAEEA [14] | | | | | 0.93 | | | |
| Reactivity (sec) | | | | | | | | |
| Cream time | 18 | 11 | 14 | 15 | 15 | 16 | 12 | 12 |
| Gel time | 50 | 50 | 48 | 50 | 50 | 51 | 49 | 49 |
| Rise time | 76 | 80 | 71 | 78 | 77 | 78 | 70 | 71 |
| Physical properties of the foam | | | | | | | | |
| Foam density in the mold (kg/m³) | 148 | 100 | 141 | 140 | 128 | 145 | 111 | 108 |
| Amount of volatized amine catalyst (μg/g) | 1680 | 1310 | 14 | 265 | 1510 | 283 | 97 | 78 |
| Hardness of foam at the time of removal from the mold (Shore C) | 3 | 6 | 0 | 0 | 15 | 3 | 14 | 13 |

TABLE 14-continued

| Moldability of foam | Δ | X | X | Δ | X | ◉ | X | X |
| Odor of foam | Δ | X | ◉ | Δ | X | Δ | ○ | ○ |

[5] 1-(2-hydroxypropyl)-2-methylimidazole (synthetic product)
[6] 1-(2-hydroxypropyl)imidazole (synthetic product)
[7] 1-(3'-aminopropyl)imidazole (synthetic product)
[8] A mixture comprising N,N,N',N"-tetramethyl-N"-(2-hydroxypropyl)diethylenetriamine and N,N,N",N"-tetramethyl-N'-(2-hydroxypropyl)diethylenetriamine (synthetic product)
[9] N,N,N'-trimethyl-N'-(2-hydroxyethyl)-bis(aminoethyl)ether (JEFFCAT-ZF10, manufactured by Hantsman)
[10] A dipropylene glycol solution containing 33.3% of triethylenediamine (TEDA-L33, manufactured by TOSOH CORPORATION)
[11] A dipropylene glycol solution containing 70% of bis(2-dimethylaminoethyl)ether (TOYOCAT-ET, manufactured by TOSOH CORPORATION)
[12] N,N-dimethylpropanediamine (reagent)
[13] Bis(3-dimethylaminopropyl)amine (reagent)
[14] N,N,N'-trimethyl-N'-(2-hydroxyethyl)ethylenediamine (TOYOCAT-RX5, manufactured by TOSOH CORPORATION)

The measuring methods for the respective measured items were as follows.

Measurement of the Reactivity

Cream time: Foaming initiation time, the time until the foam started to rise, was visually measured.

Gel time: As the reaction proceeded, the time until the liquid substance was changed to the resin substance, was measured.

Rise time: The time until the rise of foam terminated, was measured by visual observation.

Hardness of the Foam at the Time of Removal From the Mold

Measured by means of Shore-C hardness meter immediately after the foam was removed from the mold.

Moldability of the Foam

The void and cellular roughing of the molded foam was visually inspected and evaluated as the moldability as follows.

©: No void or cell roughing observed.
◉: Void and cell roughing partially observed.
Δ: Void and cell roughing observed over about one half of the surface portion.
x: Void and cell roughing observed over the entire area of the surface portion.

Foam Density in the Mold

The center portion of the molded foam was cut into a size of 200×200×15 mm, and the size and the weight were accurately measured, whereby the density was calculated. It can be judged that the lower the density in the mold, the better the flowability of the foam.

Amount of Volatized Amine Catalyst

The quantitative analysis was carried out in accordance with a method of DIN75201-G wherein the amount of the amine catalyst volatized from the foam and condensed, was measured. Namely, five sheets of foam having a size of 50×50×10 mm were cut out from the molded foam and put into a flat bottomed separable flask of 500 ml, which was covered with an aluminum foil. Then, an upper cover of a separable flask modified so that cooling water can be circulated in a void space, was put on the 500 ml flat bottomed separable flask and fixed by clamping. This container was immersed in an oil bath of 100° C. for 48 hours. After the 48 hours, the amine catalyst deposited on the aluminum foil was collected by methanol and quantitatively analyzed by gas chromatography. The quantified value was represented by μg of the amine catalyst per g of the foam.

Odor of the Foam

From the molded foam, a foam having a size of 50×50×10 mm was cut out and put into a mayonnaise bottle, and a cover was put thereon. Then, the odor of the foam was smelled by ten monitors, and the intensity of the odor was measured.

◎: No substantial odor smelled.
○: Slight odor smelled.
Δ: Odor distinctly smelled.
x: Strong odor smelled.

As is evident from Examples 8 to 12, polyurethane foams obtained by using the catalyst (D) of the present invention, have a low volatile amine catalyst content. Accordingly, the foam has a weak odor. Further, the degree of the void and cellular roughening is small, the moldability of the foams is good, and further, the hardness of the foams at the time of removal from the mold is high, and the foam products can be taken out from the molds in a short period of time, which contributes to the productivity of the foams.

Whereas, in Comparative Examples 24 and 25 which are examples for a conventional tertiary amine catalyst, a volatile amine catalyst is discharged in a large amount from the foams, whereby the foams have a strong odor. In Comparative Example 26 which is an example for an amine catalyst having a primary amino group in its molecule, the hardness of the foam at the time of removal from the mold is low, and it is impossible to taken out the foam product from the mold in a short period of time, whereby the productivity of the foam is poor. In Comparative Example 27 which is an example for a catalyst having a secondary amino group in its molecule, a volatile amine catalyst is discharged from the foam, whereby the foam has an odor. In Comparative Example 28 which is an example for a catalyst having a hydroxyethyl group in its molecule, a volatile amine catalyst is discharged in a large amount from the foam. In Comparative Example 29 which is an example wherein the amine compound of the formula (5) contained in the catalyst (D) of the present invention was used alone, the catalytic activity is low, and thus a large amount of the catalyst is required, whereby a volatile amine catalyst is discharged in a large amount from the foam. Further, the hardness of the foam at the time of removal from the mold is low, whereby the productivity of the foam is low. In Comparative Examples 30 and 31 which are examples wherein the compound of the formula (6) contained in the catalyst (D) of the present invention was used alone, although the curing of the polyurethane resin is quick, the moldability of the foam is poor.

EXAMPLES 13 TO 17 AND COMPARATIVE EXAMPLES 32 TO 38

Examples are shown in which polyester type flexible polyurethane foams were produced by means of the catalyst of the present invention and catalysts of Comparative Examples.

Polyol F, water and foam stabilizers were mixed in the mixing ratio shown in Table 15 to prepare premix D. 447.4 g of premix D was taken into a 2 l polyethylene cup, and one of the catalyst (D) of the present invention and the catalysts of Comparative Examples shown in Table 16, was added in an amount such that the reactivity would be 60 seconds as represented by the following gel time, and the temperature was adjusted to 25° C. 192.6 g of a polyisocyanate liquid (T-80) having the temperature adjusted to 25° C. in a separate container, was put into the cup of premix D, and quickly stirred by a stirrer at 6,000 rpm for 5 seconds. The mixed solution obtained by stirring was put into a mold (made of aluminum, having an internal size of 25×25×25 cm and having no upper cover) adjusted to a temperature of 40° C., and foam molding was carried out. Upon expiration of 20 minutes from the time when the mixed solution was introduced, the foam was removed from the mold. Upon expiration of one day, moldability was judged from the appearance of the molded foam. Then, the molded foam was cut, and the core density, air permeability, foam physical properties, the amount of the volatized amine catalyst and the odor of the foam, were measured and compared. The results are shown in Table 16.

TABLE 15

|  | Parts by weight (pbw) |
|---|---|
| Polyol F [15] | 100 |
| Water | 3.8 |
| Foam stabilizer A [16] | 1.5 |
| Catalyst | Varies |
| Isocyanate B [17] | Isocyanate INDEX 100 [4] |

[15] Desmophen 2200, polyester polyol, manufactured by BAYER AG (OH value = 60 mgKOH/g)
[16] L-532, silicone type surfactant, manufactured by Nippon UNICAR CO LTD
[17] T-80, toluene diisocyanate, manufactured by Nippon Polyurethane K.K.

TABLE 16

|  | Example | | | | |
|---|---|---|---|---|---|
|  | 13 | 14 | 15 | 16 | 17 |
| Amount of catalyst (pbw) | | | | | |
| 2MIZPO[5] | 0.46 | | | | |
| IZPO[6] | | 0.52 | 0.54 | 0.55 | |
| IZPA[7] | | | | | 0.45 |
| DETAPO[8] | 0.12 | 0.20 | | 0.12 | |
| DMAEO[9] | | | 0.13 | | 0.13 |
| DB[18] | | | | | |
| NEM[19] | | | | | |
| DMAPA[12] | | | | | |
| Reactivity (sec) | | | | | |
| Cream time | 13 | 12 | 13 | 13 | 12 |
| Gel time | 60 | 61 | 61 | 61 | 60 |
| Rise time | 72 | 74 | 73 | 73 | 73 |
| Physical properties of the foam | | | | | |
| Moldability of foam | ○ | ○ | ○ | ○ | ○ |
| Core density (kg/m³) | 30 | 31 | 29 | 30 | 30 |
| Air permeability of foam (ft3/min) | 0.5 | 0.6 | 0.6 | 0.5 | 0.6 |
| Elongation (%) | 194 | 192 | 188 | 191 | 187 |
| Tensile strength (kN/m²) | 123 | 125 | 128 | 125 | 127 |
| Heat and humidity permanent strain (%) | 20 | 21 | 21 | 21 | 21 |
| Amount of volatized amine catalyst (μg/g) | 37 | 44 | 46 | 48 | 46 |
| Odor of foam | ◎ | ◎ | ◎ | ◎ | ◎ |

|  | Comparative Example | | | | | | |
|---|---|---|---|---|---|---|---|
|  | 32 | 33 | 34 | 35 | 36 | 37 | 38 |
| Amount of catalyst (pbw) | | | | | | | |
| 2MIZPO[5] | | | | | 0.75 | | |
| IZPO[6] | | | | | | 1.19 | |
| IZPA[7] | | | | | | | |
| DETAPO[8] | | | | | | | 0.55 |
| DMAEO[9] | | | | | | | 0.50 |
| DB[18] | 1.50 | | | | | | |
| NEM[19] | | 1.80 | | | | | |
| DMAPA[12] | | | 0.51 | | | | |
| Reactivity (sec) | | | | | | | |

TABLE 16-continued

| | | | | | | | |
|---|---|---|---|---|---|---|---|
| Cream time | 13 | 13 | 12 | 13 | 13 | 10 | 10 |
| Gel time | 61 | 64 | 62 | 60 | 59 | 60 | 58 |
| Rise time | 72 | 76 | 75 | 75 | 77 | 73 | 70 |
| Physical properties of the foam | | | | | | | |
| Moldability of foam | ○ | ○ | Δ | ○ | ○ | X | X |
| Core density (kg/m$^3$) | 30 | 31 | 32 | 31 | 33 | Foam shrank | Foam shrank |
| Air permeability of foam (ft3/min) | 0.4 | 0.6 | 0.0 | 0.6 | 0.9 | | |
| Elongation (%) | 174 | 162 | 165 | 198 | 210 | | |
| Tensile strength (kN/m$^2$) | 127 | 120 | 120 | 129 | 138 | | |
| Heat and humidity permanent strain(%) | 22 | 21 | 43 | 31 | 30 | | |
| Amount of volatized amine catalyst (μg/g) | 3650 | 3450 | 7 | 250 | 220 | | |
| Odor of foam | X | X | ⊙ | Δ | Δ | | |

[18] N,N-dimethylbenzylamine (reagent)
[19] N-ethylmorpholine (reagent)

The measuring methods for the respective measured items were as follows.

Moldability of the Foam

The deformation state due to shrinkage of the molded foam was evaluated as follows.
○: No deformation observed.
Δ: slight deformation observed.
x: The foam shrank to about half by volume.

Foam Core Density

The center portion of the molded foam was cut into a size of 20×20×20 cm, and the size and the weight were accurately measured, whereby the core density was calculated.

Air Permeability of the Foam

The center portion of the foam, of which the foam core density was measured, was cut into a size of 50×50×25 mm, and the quantity of air flow was measured by means of an air permeability measuring apparatus (Air Flow Apparatus Model DA, manufactured by DOW).

Foam Physical Properties

In accordance with JIS K7311-1995, from the foam, of which the foam core density was measured, elongation properties and tensile strength of the foam were measured. The heat and humidity permanent compression strain was measured in accordance with JIS K6401-1980 at 50° C. for 22 hours at a humidity of 95% under a compression of 50%.

Amount of Volatized Amine Catalyst

Measured in the same method as mentioned above.

Odor of the Foam

Measured in the same method as mentioned above.

As is evident from Examples 13 to 17, polyurethane foams obtained by using the catalysts of the present invention, have a low volatile amine content, whereby the foams have a weak odor. Further, the air permeability of the foams is high, whereby the foams are free from deformation due to shrinkage after the foam molding.

Whereas, in Comparative Examples 32 and 33 which are examples for a conventional tertiary amine catalyst, a volatile amine catalyst is discharged in a large amount from the foam, whereby the foam has a strong odor. In Comparative Example 34 which is an example for an amine catalyst having a primary amino group in its molecule, the foam is poor in air permeability and undergoes deformation due to shrinkage, and the elongation and heat and humid permanent compression strain as the physical properties are poor. In Comparative Examples 35 and 36 which are examples wherein the amine compound of the formula (5) contained in the catalyst (D) of the present invention is used by itself, the catalytic activity is low, and thus a large amount of the catalyst is required, whereby the volatile amine catalyst is discharged in a large amount from the foam, and the foam has an odor. In Comparative Examples 37 and 38 which are examples wherein the amine compound of the formula (6) contained in the catalyst (D) of the present invention is used by itself, the foams have no air permeability, the foams gradually shrink after foam molding and significantly deform, whereby they can not be commercialized.

PREPARATION EXAMPLE 3

Preparation of a Solution Containing 60% of a 1-{3'-(2"-methylimidazolinyl)propyl}urea Composition 60.0 g of urea was added to 139.2 g of 1-(3'-aminopropyl)-2-methylimidazole and reacted at 160° C. for 10 hours, and after the reaction, a volatile component was removed to obtain 176.1 g of a 1-{3'-(2"-methylimidazolinyl)propyl)urea composition. 117.4 g of dipropylene glycol was added thereto to prepare a solution containing 60% of a 1-{3'-(2"-methylimidazolinyl)propyl}urea composition (IZUM), which was subjected to the following foaming test. The composition of the solution is shown in Table 17.

TABLE 17

| Catalyst component | wt % |
|---|---|
| 1-[3'-(2"-methylimidazolinyl)propyl]urea | 52.8 |
| 1,3-bis[3'-(2"-methylimidazolinyl)propyl]urea | 5.1 |
| Urea | 2.1 |
| Dipropylene glycol | 40.0 |

PREPARATION EXAMPLE 4

Preparation of a Solution Containing 60% of 1-{3'-(2"-methylimidazolinyl)propyl}urea A reaction solution obtained in the same manner as in Preparation Example 3 was separated by liquid chromatography to obtain 1-{3'-(2"-methylimidazolinyl)propyl}urea. Dipropylene glycol was added thereto to prepare a solution containing 60% of 1-{3'-(2"-methylimidazolinyl}propyl) urea (IZU), which was subjected to the following foaming test.

Here, the above catalyst compositions were diluted with a dipropylene glycol solution for prevention of crystallization, but the type of the solvent and the weight ratio of the solvent are not limited to the present Preparation Examples.

EXAMPLES 18 AND 19 AND COMPARATIVE EXAMPLES 39 TO 44

Examples are shown in which flexible polyurethane foams (ester slab treatment) were produced by means of the catalyst (E) of the present invention and catalysts of Comparative Examples.

As the catalyst, the solution containing 60% of a 1-{3'-(2''-methylimidazolinyl)propyl}urea composition (IZUM) obtained in Preparation Example 3 was used in Example 18, the solution containing 60% of 1-{3'-(2''-methylimidazolinyl)propyl}urea (IZU) obtained in Preparation Example 4 was used in Example 19, and dimethylbenzylamine (DB), N-ethylmorpholine (NEM), 1-(3'-aminopropyl)imidazole (API), 1-(2'-hydroxypropyl)imidazole (HPI), dimethylaminopropylamine (DMAPA) and 3-(dimethylamino)propyl-1-urea (DMAPU) were used in Comparative Examples 39 to 44, respectively. They are shown in Table 18.

A polyol, water and foam stabilizers were mixed in the mixing ratio shown in Table 19 to prepare premix E. 447.4 g of premix E was taken into a 2 l polyethylene cup, and one of the catalyst (E) of the present invention and the catalysts of Comparative Examples shown in Table 18, was added in an amount such that the reactivity would be 60 seconds as defined in the following gel time, and the temperature was adjusted to 25° C. 192.6 g of a polyisocyanate liquid (T-80) having the temperature adjusted to 25° C. in a separate container, was put into the cup of premix E, and quickly stirred by a stirrer at 6,000 rpm for 5 seconds. The mixed solution obtained by stirring was put into a mold (made of aluminum, having an internal size of 25×25×25 cm and having no upper cover) adjusted to a temperature of 40° C., and foam molding was carried out. Upon expiration of 20 minutes from the time when the mixed solution was introduced, the foam was removed from the mold. From the molded foam, the core density of the foam and the odor of the foam were measured and compared. Further, the odor of the catalyst was measured. The results are shown in Table 20.

TABLE 18

| Catalyst |
| --- |
| IZUM [1] |
| IZU [2] |
| DB [3] |
| NEM [4] |
| API [5] |
| HPI [6] |
| DMAPA [7] |
| DMAPU [8] |

[1] A dipropylene glycol solution containing 60.0% of an imidazole urea composition
[2] A dipropylene glycol solution containing 60.0% of 1-{3'-(2''-methylimidazolinyl)propyl}urea
[3] Dimethylbenzylamine
[4] N-ethylmorpholine
[5] 1-(3'-aminopropyl)imidazole
[6] 1-(2'-hydroxypropyl)imidazole
[7] 3-(dimethylamino)propylamine
[8] 3-(dimethylamino)propyl-1-urea

TABLE 19

|  | Parts by weight (pbw) |
| --- | --- |
| Polyol [1] | 100 |
| Water | 3.8 |
| Foam stabilizer A [2] | 1.1 |
| Foam stabilizer B [3] | 1.5 |
| TDI [4] | 45.8 |

[1] Desmophen 2200, polyester polyol, manufactured by BAYER AG (OH value = 60 mgKOH/g)
[2] SE232WA, silicone type surfactant, manufactured by Witoo-Osi
[3] B8315, silicone type surfactant, manufactured by Goldchmidt
[4] T-80, Isocyanate, manufactured by Nippon Polyurethane K.K.

TABLE 20

|  | Example | | Comparative Example | | | | | |
| --- | --- | --- | --- | --- | --- | --- | --- | --- |
|  | 18 | 19 | 39 | 40 | 41 | 42 | 43 | 44 |
| Amount of catalyst (pbw) | | | | | | | | |
| IZUM | 1.32 | | | | | | | |
| IZU | | 1.15 | | | | | | |
| DB | | | 1.50 | | | | | |
| NEM | | | | 1.80 | | | | |
| API | | | | | 1.04 | | | |
| HPI | | | | | | 1.19 | | |
| DMAPA | | | | | | | 0.51 | |
| DMAPU | | | | | | | | 0.60 |
| Reactivity (sec) | | | | | | | | |
| Cream time | 13 | 13 | 13 | 13 | 13 | 13 | 12 | 12 |
| Gel time | 61 | 60 | 61 | 64 | 61 | 59 | 60 | 60 |
| Rise time | 76 | 76 | 72 | 76 | 82 | 77 | 71 | 72 |
| Catalyst | | | | | | | | |
| Odor of catalyst | ○ | ○ | X | X | X | X | X | ○ |

TABLE 20-continued

|  | Example | | Comparative Example | | | | | |
|---|---|---|---|---|---|---|---|---|
|  | 18 | 19 | 39 | 40 | 41 | 42 | 43 | 44 |
| Physical properties of the foam | | | | | | | | |
| Mold core density (kg/m$^3$) | 30 | 30 | 30 | 31 | 29 | 30 | 30 | 30 |
| Impact resilience (%) | 30 | 30 | 29 | 32 | 30 | 28 | 28 | 28 |
| CLD (N/m$^2$) | | | | | | | | |
| 25% compressive strength | 3.3 | 3.3 | 3.4 | 3.0 | 3.2 | 3.2 | 3.4 | 3.5 |
| 65% compressive strength | 8.8 | 8.7 | 10.0 | 8.2 | 8.0 | 7.6 | 9.1 | 9.8 |
| Elongation (%) | 208 | 211 | 174 | 162 | 189 | 210 | 154 | 158 |
| Tensile strength (kN/m$^2$) | 141 | 145 | 127 | 120 | 128 | 138 | 138 | 144 |
| Tear strength (kN/m) | 0.83 | 0.86 | 0.86 | 0.83 | 0.73 | 0.73 | 0.81 | 0.90 |
| Heat and humidity permanent compression strain (%) | 19 | 22 | 22 | 21 | 28 | 17 | 25 | 32 |
| Scorching | ○ | ○ | ○ | ○ | ○ | ○ | X | X |
| Odor of foam | ○ | ○ | X | X | ○ | ○ | ○ | ○ |

The measuring methods for the respective measured items were as follows.

Measurement of the Reactivity

Cream time: Foaming initiation time, the time until the foam started to rise, was visually measured.

Gel time: As the reaction proceeded, the time until the liquid substance was changed to the resin substance, was measured.

Rise time: The time until the rise of foam terminated, was measured by visual observation.

Odor of the Catalyst 10 g of the catalyst was put in a 20 ml sample bottle, the odor of the foam was smelled by ten monitors with a distance of 10 cm between the sample and the noses, and the intensity of the odor was measured.
  ○: No substantial odor smelled.
  Δ: Odor distinctly smelled.
  x: Strong odor smelled.

Foam Core Density

The center portion of the molded foam was cut into a size of 20×20×20 cm, and the size and the weight were accurately measured, whereupon the core density was calculated.

Impact Resilience

From the foam, of which the foam core density was measured, a foam having a size of 20×20×5 cm as a test specimen was cut out, and subjected to an impact resilience test in accordance with JIS K6401-1980, and the impact resilience was measured.

Hardness of the Foam (CLD)

The foam, of which the foam core density was measured, as a test specimen, was subjected to a hardness test in accordance with JIS K6401-1980, and a 25% compressive strength and a 65% compressive strength at the core portion of the foam were measured.

Namely, in accordance with JIS K6401-1980, the test specimen was evenly placed on a support of a testing machine, a circular pressing plate having a radius of 10 cm was put on the test specimen, and the thickness was measured when the load was 0.5 kgf (4.9 N) and taken as the initial thickness. Then, the circular pressing plate was pressed in a thickness of 75% of the initial thickness, then the load was immediately removed, and then the circular pressing plate was immediately pressed again in a thickness of 65% of the initial thickness and left to stand for 20 seconds, and upon expiration of the 20 seconds, the load was read. The foam hardness was calculated from the following formula, and the foam hardness when the plate was pressed in a thickness of 25% of the initial thickness was taken as the 25% compressive strength, and the foam hardness when the plate was pressed in a thickness of 65% of the initial thickness was taken as the 65% compressive strength.

(Foam hardness) $(N/m^2)$=(load obtained by using the circular pressing plate) (N)/(area of the foam portion in contact with the circular pressing plate) (m$^2$)

Elongation of the Foam

A foam having a size of 1×1×10 cm as a test specimen was cut out from the foam, of which the foam core density was measured, and subjected to a tensile test in accordance with JIS K7311-1995, and the elongation was measured.

Tensile Strength of the Foam

A foam having a size of 1×1×10 cm as a test specimen was cut out from the foam, of which the foam core density was measured, and subjected to a tensile test in accordance with JIS K7311-1995, and the tensile strength was measured and taken as the tensile strength of the foam.

Tear Strength of the Foam

A foam having a size of 1×1×10 cm as a test specimen was cut out from the foam, of which the foam core density was measured, and subjected to a tear test in accordance with JIS K7311-1995, and the tear strength was measured and taken as the tear strength of the foam.

Heat and Humidity Permanent Compression Strain

A foam having a size of 5×5×2.5 cm was cut out from the foam, of which the foam core density was measured, and subjected to a heat and humidity aging test in accordance with JIS K6401-1980 at 50° C. for 22 hours at a humidity of 95% under a compression of 50%, and the decreasing ratio of the height was measured and taken as the heat and humidity permanent compression strain.

Scorching of the Foam

The center portion of the molded foam was visually observed to confirm the presence or absence of coloring (scorching) of the foam.
  ○: The foam not colored.
  x: The foam colored.

Odor of the Foam

From the foam, of which the foam core density was measured, a foam having a size of 5×5×5 cm was cut out and put into a mayonnaise bottle, and a cover was put thereon. Then, the odor of the foam was smelled by ten monitors, and the intensity of the odor was measured.

○: No substantial odor smelled.
Δ: Slight odor smelled.
x: Strong odor smelled.

In Examples 18 and 19 which are examples wherein the catalyst (E) of the present invention was used, substantially no odor of the amine catalyst is smelled. Further, no scorching occurred, and the foam is free from the amine odor.

Whereas, in Comparative Examples 39 and 40 which are examples for a tertiary amine catalyst having no reactive group in its molecule, which is generally used for an ester slab treatment, a very noisome amine odor is smelled. Further, the foam has a noisome amine odor. In Comparative Examples 41 and 42 which are examples for an amine catalyst having a primary amino group or a secondary hydroxyl group in its molecule, the odor of the amine catalyst is smelled. Further, in Comparative Example 43, the foaming reaction (reaction of water with isocyanate) proceeds more than necessary at the initial stage of the foaming, thus causing scorching. In Comparative Example 44 which is an example for an amine catalyst having a ureide group (NHCONH$_2$) in its molecule, the foaming reaction proceeds more than necessary at the initial stage of the foaming, thus causing scorching.

The entire disclosures of Japanese Patent Application No. 2001-152362 filed on May 22, 2001, Japanese Patent Application No. 2001-200957 filed on Jul. 2, 2001, Japanese Patent Application No. 2001-250674 filed on Aug. 21, 2001, Japanese Patent Application No. 2001-301647 filed on Sep. 28, 2001 and Japanese Patent Application No. 2002-7516 filed on Jan. 16, 2002 including specifications, claims and summaries are incorporated herein by reference in their entireties.

What is claimed is:

1. A catalyst for production of a polyurethane resin, which contains a compound of the following formula (5):

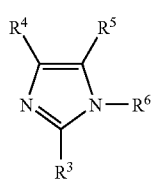

(5)

wherein each of $R^3$, $R^4$ and $R^5$ which are independent of one another, is a hydrogen atom or a $C_{1-4}$ alkyl group, $R^6$ is a hydrogen atom, a functional group of the following formula:

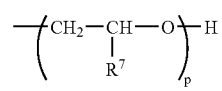

wherein $R^7$ is a hydrogen atom or a $C_{1-4}$ alkyl group, and p is an integer of from 1 to 3, or a 3-aminopropyl group; and an amine compound of the following formula (6):

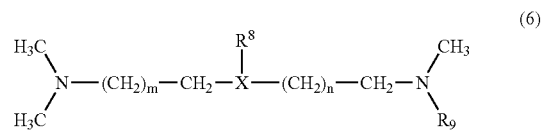

(6)

wherein X is a nitrogen atom or an oxygen atom, each of $R^8$ and $R^9$ which are independent of each other, is a methyl group or a functional group of the following formula:

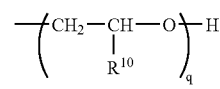

wherein $R^{10}$ is a hydrogen atom or a $C_{1-4}$ alkyl group and q is an integer of from 1 to 3, and each of m and n is an integer of from 1 to 2, provided that when X is a nitrogen atom, $R^8$ and $R^9$ are not simultaneously methyl groups, and that when X is an oxygen atom, $R^9$ is a functional group of the following formula:

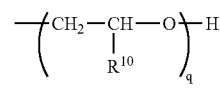

wherein $R^{10}$ is a hydrogen atom or a $C_{1-4}$ alkyl group, and q is an integer of from 1 to 3.

2. The catalyst for production of a polyurethane resin according to claim 1, wherein the amine compound of the formula (5) is an amine compound selected from the group consisting of 1-(2'-hydroxypropyl)-imidazol, 1-(2'-hydroxypropyl)-2-methylimidazol, 1-(2'-hydroxyethyl)-imidazol, 1-(2'-hydroxyethyl)-2-methylimidazol, 1-(3'-aminopropyl)-imidazol and 1-(3'-aminopropyl)-2-methylimidazol.

3. The catalyst for production of a polyurethane resin according to claim 1, wherein the amine compound of the formula (6) is an amine compound selected from the group consisting of N-(2-hydroxyethyl)-N,N',N'',N''-tetramethyldiethylenetriamine, N'-(2-hydroxyethyl)-N,N'',N'',N''-tetramethyldiethylenetriamine, N-(2-hydroxypropyl)-N,N',N'',N''-tetramethyldiethylenetriamine, N'-(2-hydroxypropyl)-N,N'',N'',N''-tetramethyldiethylenetriamine, N'-(2-hydroxypropryl)-N,N,N'-trimethyl-bis(2-aminoethyl)ether and N'-(2-hydroxyethyl)N,N',N'-trimethyl-bis(2-aminoethyl ether.

4. The catalyst for production of a polyurethane resin according to claim 1, wherein the proportion of the amine compound of the formula (5) to the amine compound of the formula (6) is from 1/9 to 9/1 by a weight ratio.

* * * * *